(12) United States Patent
Hsu et al.

(10) Patent No.: US 8,718,962 B2
(45) Date of Patent: May 6, 2014

(54) CALIBRATING METHOD FOR CALIBRATING MEASURED DISTANCE OF A MEASURED OBJECT MEASURED BY A DISTANCE-MEASURING DEVICE ACCORDING TO AMBIENT TEMPERATURE AND RELATED DEVICE

(75) Inventors: En-Feng Hsu, Hsin-Chu (TW);
Chi-Chieh Liao, Hsin-Chu (TW);
Ming-Tsan Kao, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 183 days.

(21) Appl. No.: 13/045,529

(22) Filed: Mar. 11, 2011

(65) Prior Publication Data
US 2011/0307206 A1    Dec. 15, 2011

(30) Foreign Application Priority Data

Jun. 15, 2010  (TW) ................................. 99119474 A

(51) Int. Cl.
*G06F 19/00*      (2011.01)
*G01C 25/00*      (2006.01)

(52) U.S. Cl.
USPC ...................... 702/97; 356/139.07; 250/201.6

(58) Field of Classification Search
CPC ....... G01S 17/02; G01S 17/026; G01S 17/06;
G01S 17/08; G01S 17/42; G01S 17/46;
G01S 17/87; G06F 19/3418; G06F 19/00;
G06T 2207/10028; G01T 7/0018; G01C 3/00;
G01C 25/00; G01C 22/00; G01B 11/00;
H01L 31/00; H01L 22/00; H01L 31/12;
G03B 15/02; H04N 5/217
USPC ........................................................... 702/97
See application file for complete search history.

(56) References Cited

U.S. PATENT DOCUMENTS

| 4,956,606 | A | | 9/1990 | Kwiatkowski | |
|---|---|---|---|---|---|
| 5,488,468 | A | * | 1/1996 | Kawanishi et al. | 356/4.01 |
| 5,530,548 | A | * | 6/1996 | Campbell et al. | 356/623 |
| 5,642,299 | A | * | 6/1997 | Hardin et al. | 702/142 |
| 5,915,033 | A | * | 6/1999 | Tanigawa et al. | 382/106 |
| 6,415,241 | B1 | * | 7/2002 | Yoshida | 702/159 |
| 7,123,351 | B1 | * | 10/2006 | Schaefer | 356/4.07 |
| 2002/0154907 | A1 | * | 10/2002 | Ojima | 396/61 |

(Continued)

FOREIGN PATENT DOCUMENTS

| CN | 101027574 A | | 8/2007 |
|---|---|---|---|
| CN | 101063799 A | | 10/2007 |
| JP | 2004-279684 A | * | 10/2004 |
| TW | 200900658 | | 1/2009 |

*Primary Examiner* — John Breene
*Assistant Examiner* — Ruihua Zhang
(74) *Attorney, Agent, or Firm* — Winston Hsu; Scott Margo

(57) ABSTRACT

A calibrating method of calibrating a measured distance of a measured object measured by a distance-measuring device according to an ambient temperature includes providing a temperature sensor for measuring the ambient temperature of the distance-measuring device, calculating a calibrated imaging location of the measured object according to the ambient temperature and an imaging location of the measured object, and calibrating the measured distance according to the calibrated imaging location. In this way, when the distance-measuring device measures the measured object, the error due to the variation of the ambient temperature is avoided according to the calibrating method.

13 Claims, 16 Drawing Sheets

(56) References Cited

U.S. PATENT DOCUMENTS

| | | |
|---|---|---|
| 2004/0263824 A1* | 12/2004 | Yamamoto et al. ........... 356/3.14 |
| 2006/0071151 A1* | 4/2006 | Fukamura et al. ......... 250/214.1 |
| 2008/0273758 A1* | 11/2008 | Fuchs et al. ................... 382/106 |
| 2008/0277477 A1* | 11/2008 | Thuries et al. ........... 235/462.23 |
| 2009/0009747 A1* | 1/2009 | Wolf et al. .................... 356/4.01 |
| 2010/0259648 A1* | 10/2010 | Iijima et al. .................... 348/241 |
| 2010/0314448 A1* | 12/2010 | Thuries et al. ........... 235/462.24 |
| 2011/0018973 A1* | 1/2011 | Takayama ........................ 348/47 |

* cited by examiner

US 8,718,962 B2

CALIBRATING METHOD FOR CALIBRATING MEASURED DISTANCE OF A MEASURED OBJECT MEASURED BY A DISTANCE-MEASURING DEVICE ACCORDING TO AMBIENT TEMPERATURE AND RELATED DEVICE

BACKGROUND OF THE INVENTION

1. Field of the Invention

The present invention is related to a calibrating method, and more particularly, to a calibrating method for calibrating measured distance of a measured object measured by a distance-measuring device according to ambient temperature.

2. Description of the Prior Art

A distance-measuring device emits detecting light toward a measured object, and receives reflecting light generated by the measured object reflecting the detecting light. The distance-measuring device calculates the distance between the measured object and the distance-measuring device according to variation of an imaging location of the reflecting light. However, when the distance-measuring device senses the reflecting light from the measured object, the distance-measuring device is affected by background light and a flicker phenomenon (for instance, flicker of a fluorescent lamp caused by frequency of an AC power supply) at the same time. Hence, the distance-measuring device calculates an incorrect measured distance because of the above-mentioned effect. Moreover, since the locations of the components of the distance-measuring device may shift or rotate due to assembly error during fabrication, accuracy of the measured distance obtained by the distance-measuring device is further deteriorated, causing a great inconvenience.

SUMMARY OF THE INVENTION

The present invention provides a calibrating method of calibrating a measured distance of a measured object measured by a distance-measuring device according to an ambient temperature. The distance-measuring device has a lighting component, a first lens, and an image sensor. The lighting component emits a detecting light to the measured object so as to generate a reflective light. The reflective light is focused by the first lens on the image sensor so that the measured object forms an image at a first imaging location. The distance-measuring device calculates the measured distance between the distance-measuring device and the measured object according to the first imaging location, a focal length of the first lens, and a first predetermined distance between the lighting component and the image sensor. The calibrating method comprises providing a temperature sensor for measuring the ambient temperature of the distance-measuring device, calculating a calibrated imaging location according to the ambient temperature and the imaging location, and calculating a calibrated measured distance according to the calibrated imaging location.

The present invention further provides a calibrating device of calibrating a measured distance of a measured object measured by a distance-measuring device according to an ambient temperature. The distance-measuring device has a lighting component, a first lens, and an image sensor. The lighting component emits a detecting light to the measured object to generate a reflective light. The reflective light is focused by the first lens on the image sensor so that the measured object forms an image at a first imaging location. The distance-measuring device calculates the measured distance between the distance-measuring device and the measured object according to the first imaging location, a focal length of the first lens, and a first predetermined distance between the lighting component and the image sensor. The calibrating device comprises a temperature sensor and a temperature compensation calculating circuit. The temperature sensor is utilized for measuring the ambient temperature of the distance-measuring device. The temperature compensation calculating circuit is utilized for calculating a first calibrated imaging location according to the ambient temperature and the first imaging location, and providing the first calibrated imaging location to the distance-measuring device for the distance-measuring device calculating a calibrated measured distance.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
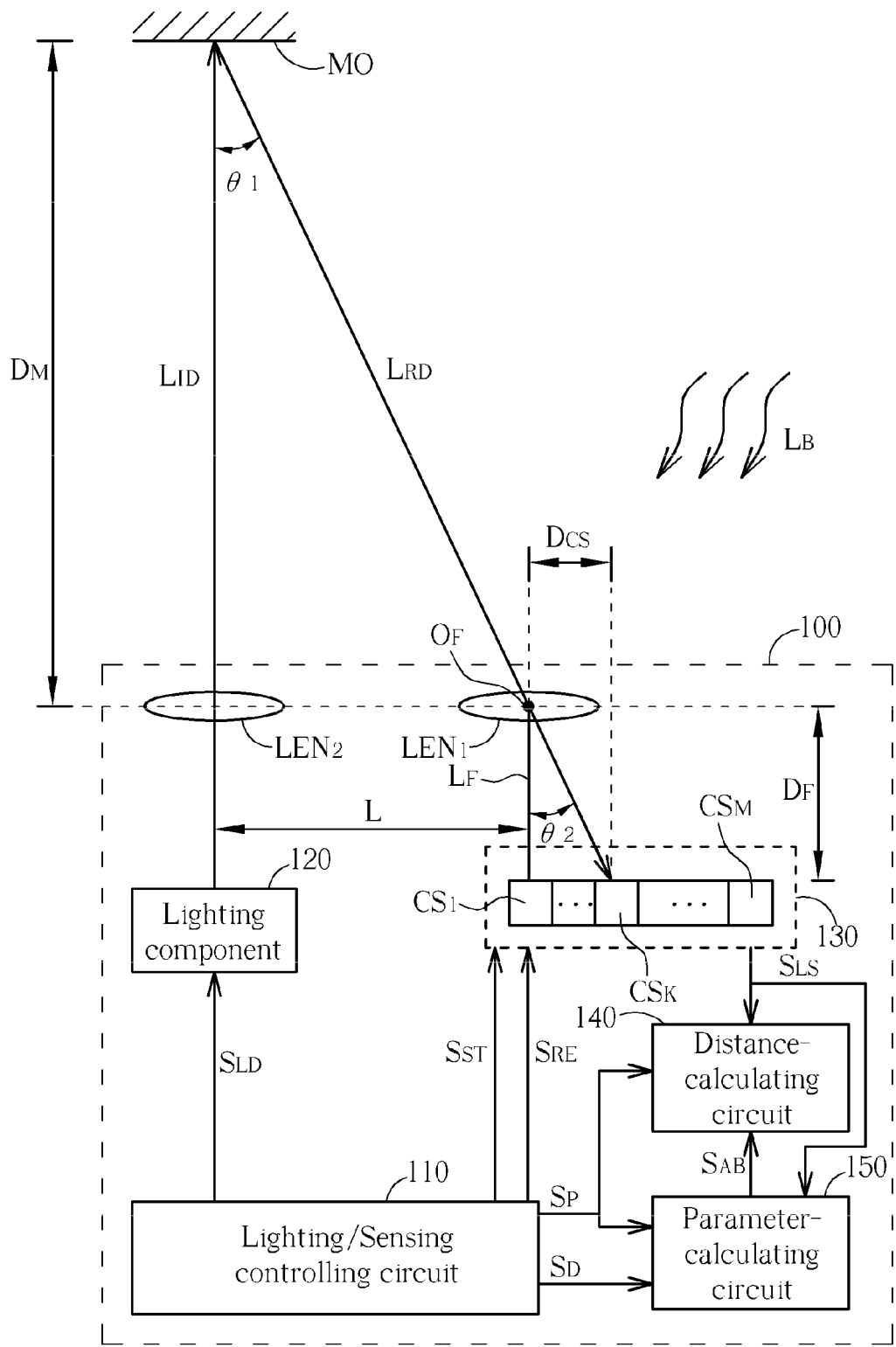
FIG. 1 and FIG. 2 are diagrams illustrating the structure and the operation principle of a distance-measuring device according to the present invention.
Figure 2:
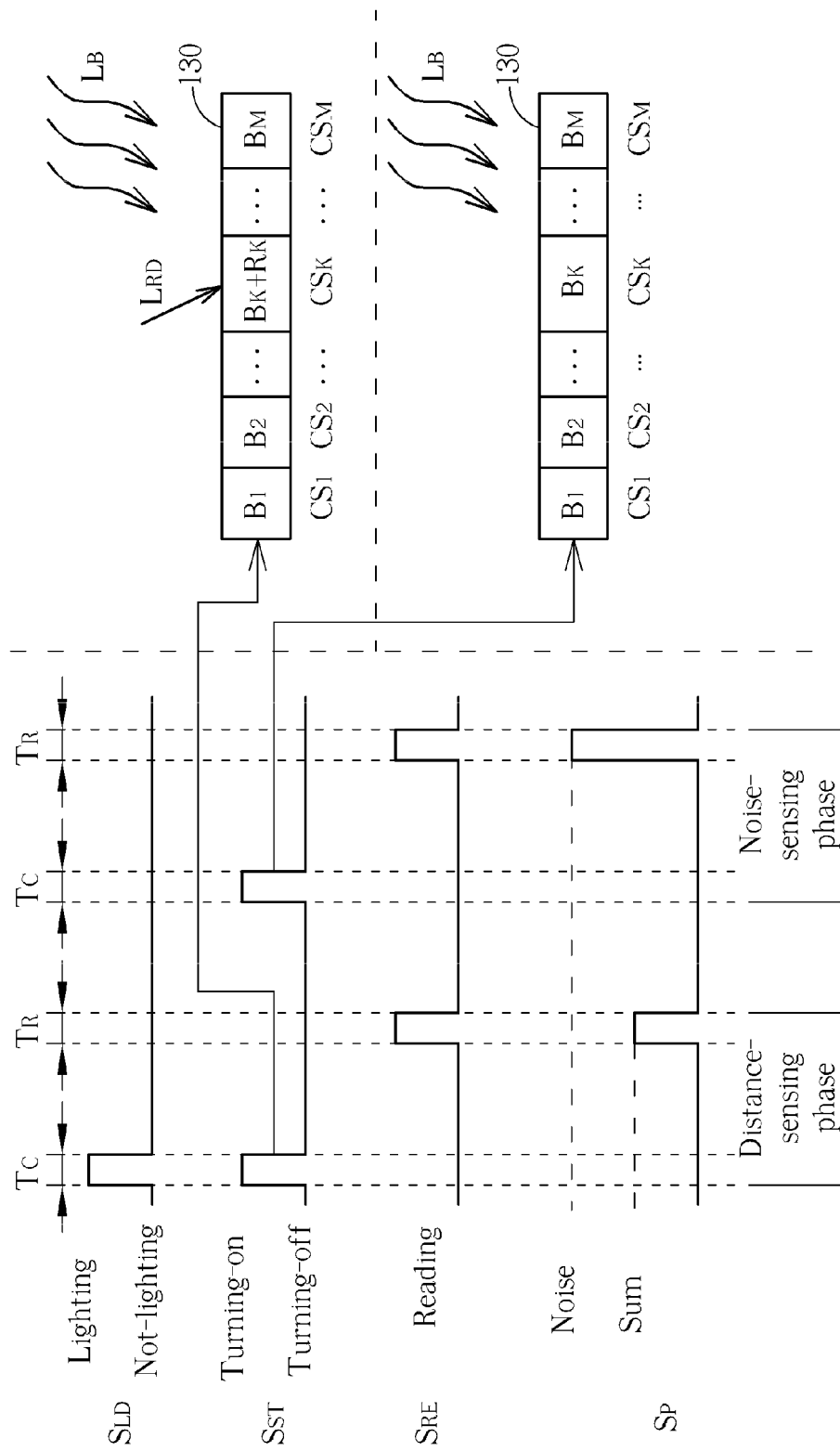

Please refer to FIG. 1 and FIG. 2. FIG. 1 and FIG. 2 are diagrams illustrating the structure and the operation principle of a distance-measuring device 100 according to the present invention. The distance-measuring device 100 measures distance according to the variation of the imaging location. More particularly, the distance-measuring device 100 measures the measured distance $D_M$ between the measured object MO and the distance-measuring device 100. The distance-measuring device 100 comprises a lighting/sensing controlling circuit 110, a lighting component 120, an image sensor 130, a distance-calculating circuit 140, a parameter-calculating circuit 150, and a lens $LEN_1$. The coupling relations between the components of the distance-measuring device 100 are shown in FIG. 1, and hence will not be repeated again for brevity.

The lighting/sensing controlling circuit 110 generates a lighting pulse signal $S_{LD}$, a shutter pulse signal $S_{ST}$, a phase signal $S_P$, a reading signal $S_{RE}$, and a known-distance signal $S_D$. Measuring the distance by the distance-measuring device 100 can be divided into two phases: 1. distance-sensing phase; 2. noise-sensing phase. During the distance-sensing phase, the lighting/sensing controlling circuit 110 generates the lighting pulse signal $S_{LD}$ representing "lighting" and the shutter pulse signal $S_{ST}$ representing "turning-on", wherein the pulse widths of the lighting pulse signal $S_{LD}$ representing "lighting" and the shutter pulse signal $S_{ST}$ representing "turning-on" are both equal to $T_C$. Then the lighting/sensing controlling circuit 110 generates the reading signal $S_{RE}$ representing "reading" and the phase signal $S_P$ representing "sum", wherein the pulse widths of the reading signal $S_{RE}$ representing "reading" and the phase signal $S_P$ representing "sum" are both equal to $T_R$. During the noise-sensing phase, the lighting/sensing controlling circuit 110 generates the shutter pulse signal $S_{ST}$ representing "turning-on" and the lighting pulse signal $S_{LD}$ represents "not-lighting" at the time, wherein the pulse width of the shutter pulse signal $S_{ST}$ representing "turning-on" during the noise-sensing phase is still equal to $T_C$. Then the lighting/sensing controlling circuit 110 generates the reading signal representing "reading" and the phase signal $S_P$ representing "noise", wherein the pulse widths of the reading signal $S_{RE}$ representing "reading" and the phase signal $S_P$ representing "noise" are still both equal to $T_R$.

The lighting component 120, according to the lighting pulse signal $S_{LD}$, emits a detecting light $L_{ID}$ to the measured object MO, so that the measured object MO generates a reflecting light $L_{RD}$. More particularly, when the lighting pulse signal $S_{LD}$ represents "lighting", the lighting component 120 emits the detecting light $L_{ID}$ to the measured object MO; when the lighting pulse signal $S_{LD}$ represents "not-lighting", the lighting component 120 does not emit the detecting light $L_{ID}$. In addition, the lighting component 120 can be a Light-Emitting Diode (LED) or a laser diode. When the lighting component 120 is an LED, the distance-measuring device 100 selectively comprises a lens $LEN_2$ for focusing the detecting light $L_{ID}$ emitting to the measured object MO.

The lens $LEN_1$ focuses a background light $L_B$ or the reflecting light $L_{RD}$ to the image sensor 130. The image sensor 130 comprises M sensing units $CS_1$~$CS_M$. In the present embodiment, the M sensing units $CS_1$~$CS_M$ are illustrated to be arranged side by side for example. The width of each sensing unit is equal to a pixel width $W_{PIX}$. That is, the total width of the M sensing units $CS_1$~$CS_M$ arranged side by side is equal to ($M \times W_{PIX}$). The sensing units $CS_1$~$CS_M$ sense the energy of the light focused by the lens $LEN_1$ according to the shutter pulse signal $S_{ST}$. More particularly, when the shutter pulse signal $S_{ST}$ represents "turning-on", the sensing units $CS_1$~$CS_M$ sense the energy of the light (for example, the background light $L_B$ or the reflecting light $L_{RD}$) focused by the lens $LEN_1$ so as to generate the light-sensed signal; when the shutter pulse signal $S_{ST}$ represents "turning-off", the sensing units $CS_1$~$CS_M$ do not sense the energy of the light focused by the lens $LEN_1$. For example, when the shutter pulse signal $S_{ST}$ represents "turning-on", the sensing unit $CS_1$ senses the energy of the light focused by the lens $LEN_1$ so as to generate the light-sensed signal $S_{LS1}$, the sensing unit $CS_2$ senses the energy of the light focused by the lens $LEN_1$ so as to generate the light-sensed signal $S_{LS2}$, . . . , and the sensing unit $CS_M$ senses the energy of the light focused by the lens $LEN_1$ so as to generate the light-sensed signal $S_{LSM}$. In addition, when the reading signal $S_{RE}$ represents "reading", the sensing units $CS_1$~$CS_M$ outputs the light-sensed signal $S_{LS1}$~$S_{LSM}$, respectively.

The distance-calculating circuit 140 comprises a plurality of storing units for respectively storing the light-sensed signals $S_{LS1}$~$S_{LSM}$ outputted by the sensing units $CS_1$~$CS_M$. The distance-calculating circuit 140 sets the attributes of the received light-sensed signals according to the phase signal $S_P$. In the present embodiment, the distance-calculating circuit 140 is illustrated to comprise M storing units $M_1$~$M_M$ for example. When the phase signal Sp represents "sum", the storing units $M_1$~$M_M$ set the attributes of the received light-sensed signals positive. That is, the received light-sensed signals $S_{LS1}$~$S_{LSM}$ are marked as positive light-sensed signals $S_{LS1+}$~$S_{LSM+}$ according to the phase signal Sp representing "sum". When the phase signal $S_P$ represents "noise", the storing units $M_1$~$M_M$ set the attributes of the received light-sensed signals negative. That is, the received light-sensed signals $S_{LS1}$~$S_{LSM}$ are marked as negative light-sensed signals $S_{LS1-}$~$S_{LSM-}$ according to the phase signal $S_P$ representing "noise". The distance-calculating circuit 140 calculates the measured distance $D_M$ according to the positive light-sensed signals $S_{LS1+}$~$S_{LSM+}$ and the negative light-sensed signals $S_{LS1-}$~$S_{LSM-}$. The operation principle of the distance-calculating circuit 140 calculating the measured distance $D_M$ is illustrated as below.

As shown in the left part of FIG. 2, during the distance-sensing phase, the lighting/sensing controlling circuit 110 generates the lighting pulse signal $S_{LD}$ represents "lighting" for the lighting component 120 emitting the detecting light $L_{ID}$ to the measured object MO, so that the measured object MO generates the reflecting light $L_{RD}$. Meanwhile, the lighting/sensing controlling circuit 110 generates the shutter pulse signal $S_{ST}$ representing "turning-on" for the sensing units $CS_1$-$CS_M$ sensing the energy of the reflecting light $L_{RD}$ and the background light $L_B$, so that the sensing units $CS_1$~$CS_M$ generate the light-sensed signals $S_{LS1}$~$S_{LSM}$ respectively. Then the lighting/sensing controlling circuit 110 outputs the reading signal $S_{RE}$ representing "reading" for the image sensor 130 outputting the light-sensed signals $S_{LS1}$~$S_{LSM}$ to the distance-calculating circuit 140, and the lighting/sensing controlling circuit 110 generates the phase signal $S_P$ representing "sum" for indicating the distance-calculating circuit 140 that the received light-sensed signals are the light-sensed signals of the distance-sensing phase. That is, the received light-sensed signals of the distance-calculating circuit 140 at the time are the positive light-sensed signals $S_{LS1+}$~$S_{LSM+}$. It is assumed that the reflecting light $L_{RD}$ is mainly focused on the sensing unit $CS_K$ during the distance-sensing phase (as shown in FIG. 2). The values of the received positive light-sensed signals $S_{LS1+}$~$S_{LSM+}$ are shown in the right upper part of FIG. 2. The sensing unit $CS_K$ senses the background light $L_B$ and the reflecting light $L_{RD}$ (that is, the measured object MO images on the sensing unit $CS_K$). Therefore, the light-sensed signal $S_{LSK+}$ is equal to the sum of the energy $B_K$, which is accumulated by the sensing unit $CS_K$ sensing the background light $L_B$, and the energy $R_K$, which is accumulated by the sensing unit $CS_K$ sensing the reflecting light $L_{RD}$. The other sensing units only receive the background light $L_B$. For example, the light-sensed signal $S_{LS1+}$ is equal to the energy $B_1$, which is accumulated by the sensing unit $CS_1$ sensing the background light $L_B$; the light-sensed signal $S_{LS2+}$ is equal to the energy $B_2$, which is accumulated by the sensing unit $CS_2$ sensing the background light $L_B$; . . . ; the light-sensed signal $S_{LSM+}$ is equal to the energy $B_M$, which is accumulated by the sensing unit $CS_M$ sensing the background light $L_B$.

As shown in the left part of FIG. 2, during the noise-sensing phase, the lighting/sensing controlling circuit 110 generates the shutter pulse signal $S_{ST}$ representing "turning-on" for the sensing units $CS_1$~$CS_M$ sensing the energy of the light focused by the lens $LEN_1$ so as to generate the light-sensed signals $S_{LS1}$~$S_{LSM}$. Meanwhile, the lighting/sensing controlling circuit 110 generates the lighting pulse signal $S_{LD}$ represents "not-lighting". Hence, the lighting component 120 does not emit the detecting light $L_{ID}$ to the measured object MO, so that the measured object MO does not generate the reflecting light $L_{RD}$. Then the lighting/sensing controlling circuit 110 outputs the reading signal $S_{RE}$ representing "reading" for the image sensor 130 outputting the light-sensed signals $S_{LS1}$~$S_{LSM}$ to the distance-calculating circuit 140, and the lighting/sensing controlling circuit 110 generates the phase signal $S_P$ representing "noise" for indicating the distance-calculating circuit 140 that the received light-sensed signals are the light-sensed signals of the noise-sensing phase at the time. That is, the received light-sensed signals of the distance-calculating circuit 140 are the negative light-sensed signals $S_{LS1-}$~$S_{LSM-}$. The values of the received positive light-sensed signals $S_{LS1-}$~$S_{LSM-}$ are shown in the right lower part of FIG. 2. The pulse width of shutter pulse signal $S_{ST}$ during the distance-sensing phase is equal to the pulse width of shutter pulse signal $S_{ST}$ during the noise-sensing phase (both are equal to $T_C$). Therefore, the parts, which corresponds to the background light $L_B$, of the light-sensed signals $S_{LS1}$~$S_{LSM}$ of the distance-sensing phase are equal to the parts, which corresponds to the background light $L_B$, of the light-sensed signals $S_{LS1}$~$S_{LSM}$ of the noise-sensing phase. In other words, the parts contributed by the background light $L_B$ of the positive light-sensed signals $S_{LS1+}$~$S_{LSM+}$ are equal to the parts contributed by the background light $L_B$ of the negative light-sensed signals $S_{LS1-}$~$S_{LSM-}$ (both are equal to $B_1$~$B_M$).

After the distance-sensing phase and the noise-sensing phase, the lighting/sensing controlling circuit 110 generates the phase signal $S_P$ representing "distance-calculating". Meanwhile, the distance-calculating circuit 140 deducts the negative light-sensed signals $S_{LS1-}$~$S_{LSM-}$ stored in the storing units from the positive light-sensed signals $S_{LS1+}$~$S_{LSM+}$ stored in the storing units. The distance-calculating circuit 140 finds out the storing units having the maximum stored value after the deduction and accordingly determines the imaging location of the reflecting light $L_{RD}$ on the image sensor 130. More particularly, the values of the storing units $M_1$~$M_M$ of the distance-calculating circuit 140 are respectively equal to the values of the negative light-sensed signals $S_{LS1-}$~$S_{LSM-}$ deducting from the positive light-sensed signals $S_{LS1+}$~$S_{LSM+}$. For instance, the storing unit $M_1$ stores the value of the negative light-sensed signal $S_{LS1-}$ deducting from the positive light-sensed signal $S_{LS1+}$. Since the positive light-sensed signal $S_{LS1+}$ and the negative light-sensed signal $S_{LS1-}$ are both equal to $B_1$, the stored value of the storing unit $M_1$ after the deduction is equal to zero. The storing unit $M_2$ stores the value of the negative light-sensed signal $S_{LS2-}$ deducting from the positive light-sensed signal $S_{LS2+}$. Since the positive light-sensed signal $S_{LS2+}$ and the negative light-sensed signal $S_{LS2-}$ are both equal to $B_2$, the stored value of the storing unit $M_2$ after the deduction is equal to zero. Similarly, the storing unit $M_K$ stores the value of the negative light-sensed signal $S_{LSK-}$ deducting from the positive light-sensed signal $S_{LSK+}$. Since the positive light-sensed signal $S_{LSK-}$ is equal to ($R_K$+$B_K$) and the negative light-sensed signal $S_{LSK-}$ is equal to $B_K$, the stored value of the storing unit $M_K$ after the deduction is equal to $R_K$. The storing unit $M_M$ stores the value of the negative light-sensed signal $S_{LSM-}$ deducting from the positive light-sensed signal $S_{LSM+}$. Since the positive light-sensed signal $S_{LSM+}$ and the negative light-sensed signal $S_{LSM-}$ are both equal to $B_M$, the stored value of the storing unit $M_M$ after the deduction is equal to zero. In other words, among the storing units $M_1$~$M_M$, the stored value of the storing unit $M_K$ is equal to $R_K$, and the stored value of the other sensing units are all equal to zero. Consequently, the distance-calculating circuit 140 determines the positive light-sensed signal stored in the storing unit $M_K$ has the energy corresponding to the reflecting light $L_{RD}$. Since the storing unit $M_K$ stores the light-sensed signal generated by the sensing unit $CS_K$, the distance-calculating circuit 140 determines the reflecting light $L_{RD}$ generated by the measured object MO is mainly focused on the sensing unit $CS_K$. In this way, the distance-calculating circuit 140 calculates the imaging location $D_{CS}$ of the reflecting light $L_{RD}$ of FIG. 1 according to the sensing unit $CS_K$ and the following formula:

$$D_{CS} = K \times W_{PIX} \quad (1);$$

In addition, since, in FIG. 1, the straight light $L_F$ formed between the focus point $O_{F1}$ of the lens $LEN_1$ and the sensing unit $CS_1$ is parallel to the detecting light $L_{ID}$, the included angle $\theta_1$ between the detecting light $L_{ID}$ and the reflecting light $L_{RD}$ is equal to the included angle $\theta_2$ between the straight line $L_F$ and the reflecting light $L_{RD}$. In other words, the relation between $\tan \theta_1$ and $\tan \theta_2$ is represented as the following formula:

$$\tan \theta_1 = L/D_M = \tan \theta_2 = D_{CS}/D_F \quad (2);$$

wherein L represents the predetermined distance between the lighting component 120 and the image sensor 130 (or between the detecting light $L_{ID}$ and the reflecting light $L_{RD}$); $D_{CS}$ represents the imaging location of the reflecting light $L_{RD}$; $D_F$ represent the focus length of the lens $LEN_1$. The measured distance $D_M$ is represented as the following formula according to the formula (2):

$$D_M = (D_F \times L)/D_{CS} \quad (3);$$

as a result, the distance-calculating circuit 140 calculates the imaging location $D_{CS}$ according to the formula (1), and then calculates the measured distance $D_M$ according to the predetermined distance L, the focus length $D_F$, and the formula (3).

In conclusion, in the distance-measuring device 100, during the distance-sensing phase, the lighting/sensing controlling circuit 110 controls the lighting component 120 to emit the detecting light $L_{ID}$ to the measured object MO. The storing units $M_1$~$M_M$ store the positive light-sensed signals $S_{LS1+}$~$S_{LSM+}$ generated by the sensing unit $CS_1$~$CS_M$ sensing the light (for instance, the reflecting light $L_{RD}$ and the background light $L_B$) focused by the lens $LEN_1$. During the noise-sensing phase, the lighting/sensing controlling circuit 110 controls the lighting component 120 not to emit the detecting light $L_{ID}$ to the measured object MO. The storing units $M_1 \sim M_M$ store the negative light-sensed signals $S_{LS1-} \sim S_{LSM-}$ generated by the sensing unit $CS_1 \sim CS_M$ sensing the light (for instance, the background light $L_B$) focused by the lens $LEN_1$. Then the stored values of the storing units $M_1 \sim M_M$ are equal to the values of the negative light-sensed signals $S_{LS1-} \sim S_{LSM-}$ deducting from the positive light-sensed signals $S_{LS1+} \sim S_{LSM+}$. Thus, the stored value of the storing unit $M_K$, corresponding to the sensing unit $CS_K$ where the reflecting light $L_{RD}$ is focused, is larger than the other storing units. In this way, the distance-calculating circuit 140 determines the reflecting light $L_{RD}$ is focused to the sensing unit $CS_K$, and accordingly calculates the imaging location $D_{CS}$ of the reflecting light $L_{RD}$. Therefore, the distance-calculating circuit 140 can calculate the measured distance $D_M$ according to the imaging location $D_{CS}$, the focus length $D_F$ of the lens $LEN_1$, and the predetermined distance L.

Furthermore, in the distance-measuring device 100, the distance-sensing phase and the noise-sensing phase can repeat over and over (for example, Y times), so that the storing units $M_1 \sim M_M$ store the positive light-sensed signals corresponding to the Y distance-sensing phases, and store the negative light-sensed signals corresponding to the Y noise-sensing phases. The parts of the positive light-sensed signals, which corresponds to the background light $L_B$ during each distance-sensing phase, are counteracted by the parts of the negative light-sensed signals, which corresponds to the background light $L_B$ during each noise-sensing phase. Hence, besides the value of the storing unit $M_K$, corresponding to the sensing unit $CS_K$ where the reflecting light $L_{RD}$ is focused, is equal to $(Y \times R_K)$, the values of the other storing units are all equal to zero. In this way, even the reflecting light $L_{RD}$ is so weak that the energy $R_K$ sensed by the sensing unit $CS_K$ is very small, the distance-measuring device 100 still can enlarge the difference between the value of the storing unit $M_K$ and the values of the other storing units by repeating the distance-sensing phase and the noise-sensing phase for several times (that is, Y is enlarged). In this way, in spite of the weak reflecting light $L_{RD}$, the distance-calculating circuit 140 still can correctly determine the storing unit $M_K$ having the maximum value, and accordingly calculates the imaging location of the reflecting light $L_{RD}$.

Figure 3:
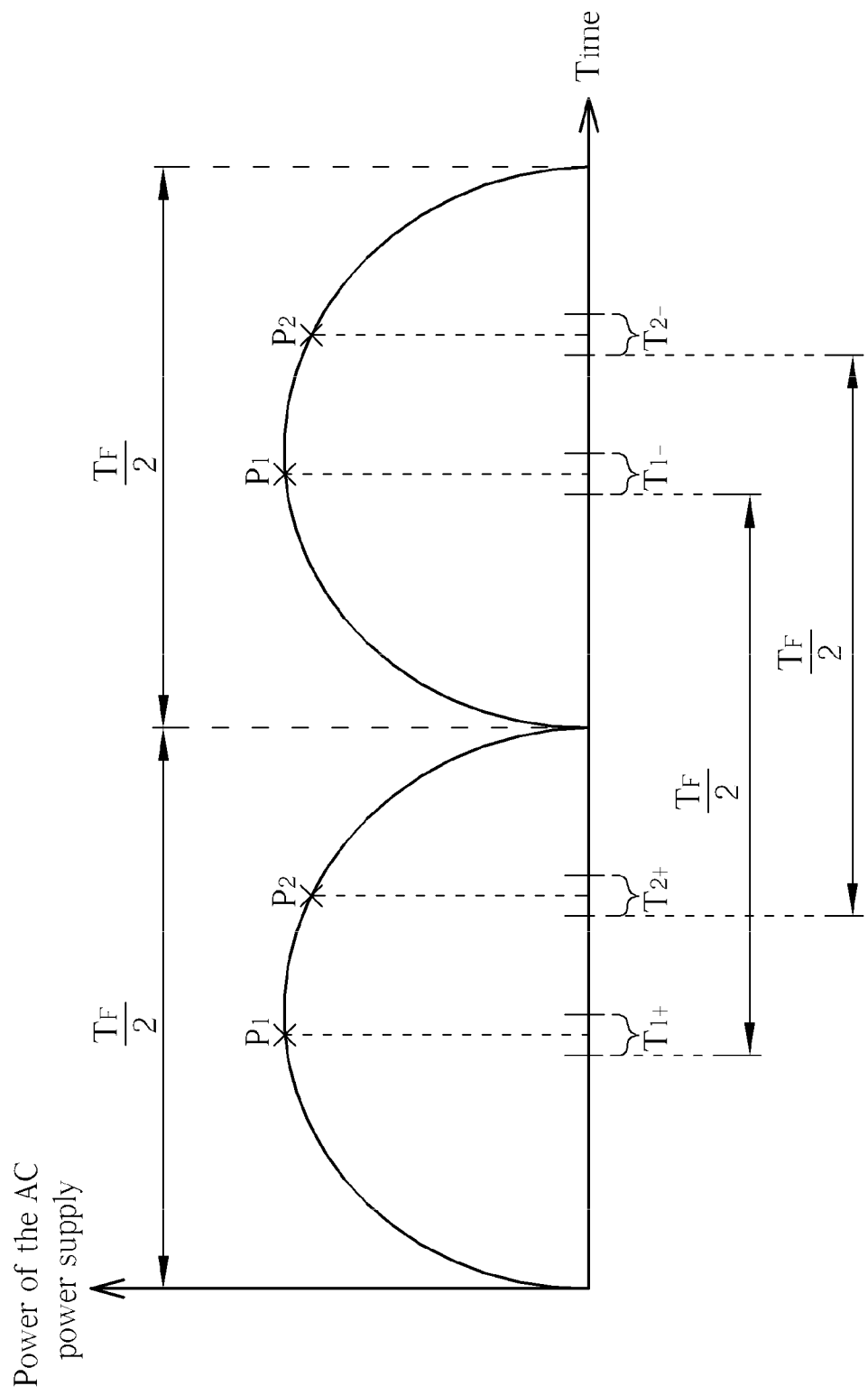
FIG. 3 is a diagram illustrating the operation principle of the distance-measuring device reducing the flicker phenomenon according to the present invention.

Please refer to FIG. 3. FIG. 3 is a diagram illustrating the operation principle of the distance-measuring device 100 reducing the flicker phenomenon. Since the power of the general indoor light sources are from the AC power supply, a part of the background light $L_B$ (which is referred as the flicking light $L_F$ hereinafter) flicks because of the frequency of the AC power supply. For example, the power of the indoor fluorescent lamp is from the AC power supply. Therefore, the light emitted by the fluorescent lamp is affected by the frequency of the AC power supply, so that the flicker phenomenon is generated. In FIG. 3, it is assumed that the cycle of the AC power supply (or the AC cycle) is $T_F$ (for example, the frequency of the AC power supply is 60 Hz, and the AC cycle is 0.0167 s). The power P of the AC power supply varies with time. Hence, the power of the flicking light $L_F$ varies as well. However, the varying cycle of the power P of the AC power supply is equal to a half of the AC cycle (that is, $T_F/2$). For example, when the time is T, the power P of the AC power supply is equal to $P_T$; when the time is $(T+T_F/2)$, the power P of the AC power supply is still equal to $P_T$. Since the power of the flicking light is proportional to the power P of the AC power supply, the varying cycle of the power of the flicking light $L_F$ is equal to a half of the AC cycle (that is, $T_F/2$) as well. In this way, in the distance-measuring device 100, the lighting/sensing controlling circuit 110 controls the time interval between the distance-sensing phases (for example, $T_{1+}$ and $T_{2+}$ shown in FIG. 3) and the noise-sensing phases (for example, $T_{1-}$ and $T_{2-}$ shown in FIG. 3) equal to a half of the AC cycle $T_F/2$ for reducing the effect of the flicker phenomenon. More particularly, the lighting/sensing controlling circuit 110 controls the sensing units $CS_1 \sim CS_M$ sensing the flicking light $L_F$ corresponding to the power $P_1$ (or $P_2$) of the AC power supply during the distance-sensing phase $T_{1+}$ (or $T_{2+}$), so that the parts of the positive light-sensed signals, which correspond to the flicking light $L_F$, are equal to $F_{11} \sim F_{M1}$ (or $F_{12} \sim F_{M2}$). The lighting/sensing controlling circuit 110 controls the time interval between the distance-sensing phase $T_{1+}$ (or $T_{2+}$) and the noise-sensing phase $T_{1-}$ (or $T_{2-}$) equal to a half of the AC cycle $T_F/2$ (for example, 0.0083 s). As a result, the power of the flicking light $L_F$ sensed by the sensing units $CS_1 \sim CS_M$ during the noise-sensing phase $T_{1-}$ (or $T_{2-}$) is equal to the power of the flicking light $L_F$ sensed by the sensing units $CS_1 \sim CS_M$ during the distance-sensing phase $T_{1+}$ (or $T_{2+}$). In this way, the parts, corresponding to the flicking light $L_F$, of the negative light-sensed signals generated by the sensing units $CS_1 \sim CS_M$ during the noise-sensing phase $T_{1-}$ (or $T_{2-}$) are equal to $F_{11} \sim F_{M1}$ (or $F_{12} \sim F_{M2}$) as well. Consequently, the parts, corresponding to the flicking light $L_F$, of the positive light-sensed signals of the distance-sensing phase $T_{1+}$ (or $T_{2+}$) are counteracted by the parts, corresponding to the flicking light $L_F$, of the negative light-sensed of the noise-sensing phase $T_{1-}$ (or $T_{2-}$) signals. In other words, besides the value of the storing unit $M_K$, which corresponds to the sensing unit $CS_K$ where the reflecting light $L_{RD}$ is focused, is equal to $R_K$, the values of the other storing units are all equal to zero. Hence, even the sensing units $CS_1 \sim CS_M$ sense the flicking light $L_F$, the lighting/sensing controlling circuit 110 still can reduce the effect of the flicker phenomenon by controlling the time interval between the distance-sensing phase and the noise-sensing phase equal to a half of the AC cycle ($T_F/2$), so that the distance-calculating circuit 140 correctly determines the imaging location $D_{CS}$ of the reflecting light $L_{RD}$ and accordingly calculates the measured distance $D_M$.

Since, when the distance-measuring device 100 is assembled during the fabrication, the locations of the components of the distance-measuring device 100 are affected by the assembly error, the distance-measuring device 100 is affected by the assembly error when the distance-measuring device 100 measures distance. In the present invention, the parameter-calculating circuit 150 of the distance-measuring device 100 is utilized for calibrating the assembly error of the distance-measuring device 100. The operation principle of the parameter-calculating circuit 150 is illustrated as below.

The parameter-calculating circuit 150 receives the known-distance signal $S_D$ for obtaining a known distance $D_{C1}$ and a known distance $D_{C2}$, wherein the known distance $D_{C1}$ is the distance between a calibrating object $CO_1$ and the distance-measuring device 100, and the known distance $D_{C2}$ is the distance between a calibrating object $CO_2$ and the distance-measuring device 100. By means of the method illustrated in FIG. 2, the lighting component 120 is controlled to emit the detecting light $L_{ID}$ to the calibrating objects $CO_1$ and $CO_2$, so that the parameter-calculating circuit 150 can obtain the imaging location of the reflecting light $L_{RD}$ according to the light-sensed signals outputted by the images sensor 130 and accordingly calibrates the assembly error of the distance-measuring device 100.

First, it is assumed that the detecting light $L_{ID}$ emitted by the lighting component 120 rotates a lighting-error angle $\theta_{LD}$ because of the assembly error.

Figure 4:
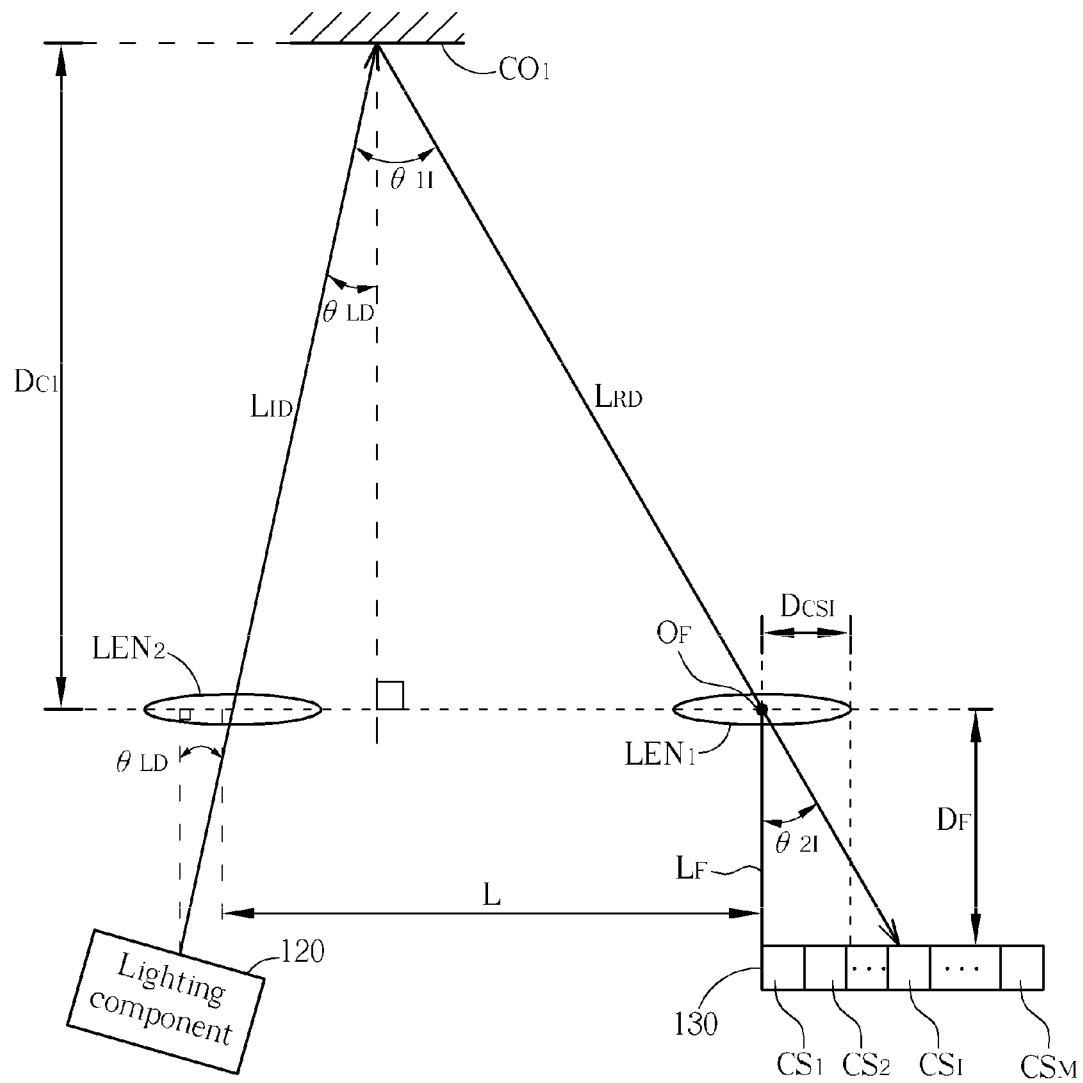
FIG. 4 is a diagram illustrating a calibrating method of calibrating the lighting-error angle of the detecting light emitted by the lighting-component.

Please refer to FIG. 4. FIG. 4 is a diagram illustrating a calibrating method of calibrating the lighting-error angle $\theta_{LD}$ of the detecting light $L_{ID}$ emitted by the lighting-component 120. The lighting/sensing controlling circuit 110 controls the lighting component 120 to emit the detecting light $L_{ID}$ to the calibrating object $CO_1$. The distance between the calibrating object $CO_1$ and the distance-measuring device 100 is the known distance $D_{C1}$. Since the detecting light $L_{ID}$ is affected by the assembly error of the lighting component 120, the detecting light $L_{ID}$ emits to the calibrating object $CO_1$ with a lighting-error angle $\theta_{LD}$, and the reflecting light $L_{RD}$ generated by the calibrating object $CO_1$ reflecting the detecting light $L_{ID}$ is focused to the sensing unit $CS_1$. The included angle between the detecting light $L_{ID}$ and the reflecting light $L_{RD}$ is $\theta_{1I}$. The included angle between the straight line $L_F$ and the reflecting light $L_{RD}$ is $\theta_{2I}$. As shown in FIG. 4, since the straight light $L_F$ is parallel to the surface normal of the calibrating object $CO_1$, $(\theta_{1I}-\theta_{LD})$ is equal to $\theta_{2I}$. That is, tan $(\theta_{1I}-\theta_{LD})$ is equal to tan $\theta_{2I}$. Therefore, the following formulas are obtained:

$$D_{C1}=1/[1/(D_F\times L)\times D_{CSI}+B] \quad (4);$$

$$B=\tan\theta_{LD}/L \quad (5);$$

wherein B represents the calibrating parameter for calibrating the lighting-error angle $\theta_{LD}$; $D_{CSI}$ represents the imaging location of the reflecting light $L_{RD}$. Thus, the parameter-calculating circuit 150 calculates the calibrating parameter B according to the formula (4). In this way, the parameter-calculating circuit 150 outputs the calibrating parameter B to the distance-calculating circuit 140 through the parameter signal $S_{AB}$, so that the distance-calculating circuit 140 calibrates the formula (2) to be the following formula for calculating the calibrated measured distance $D_M$:

$$D_M=1/[1/(D_F\times L)\times D_{CS}+B] \quad (6);$$

as a result, even the detecting light $L_{ID}$ emitted by the lighting component 120 rotates a lighting-error angle $\theta_{LD}$ because of the assembling-error, the distance-calculating circuit 140 still can correctly calculate the measured distance $D_M$, according to the calibrating parameter B, the focus length of the lens $LEN_1$, the predetermined distance L, and the imaging location $D_{CS}$ of the reflecting light $L_{RD}$ when the measured object MO is measured, by means of the parameter-calculating circuit 150 calculating the calibrating parameter B capable of calibrating the lighting-error angle $\theta_{LD}$.

Figure 5:
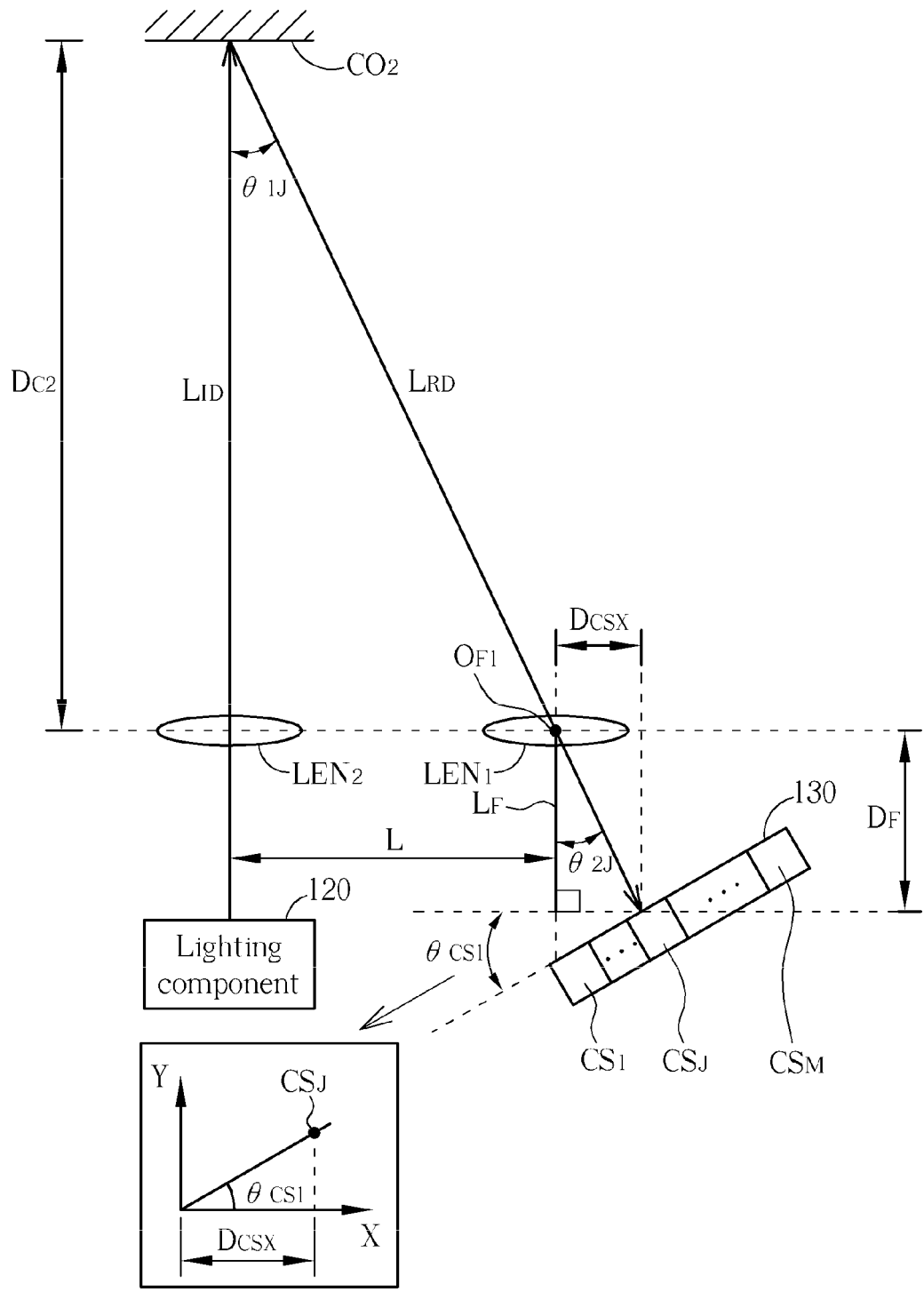
FIG. 5 and FIG. 6 are diagrams illustrating a calibrating method of calibrating sensing-error angles rotated by the image sensor because of the assembly error.
Figure 6:
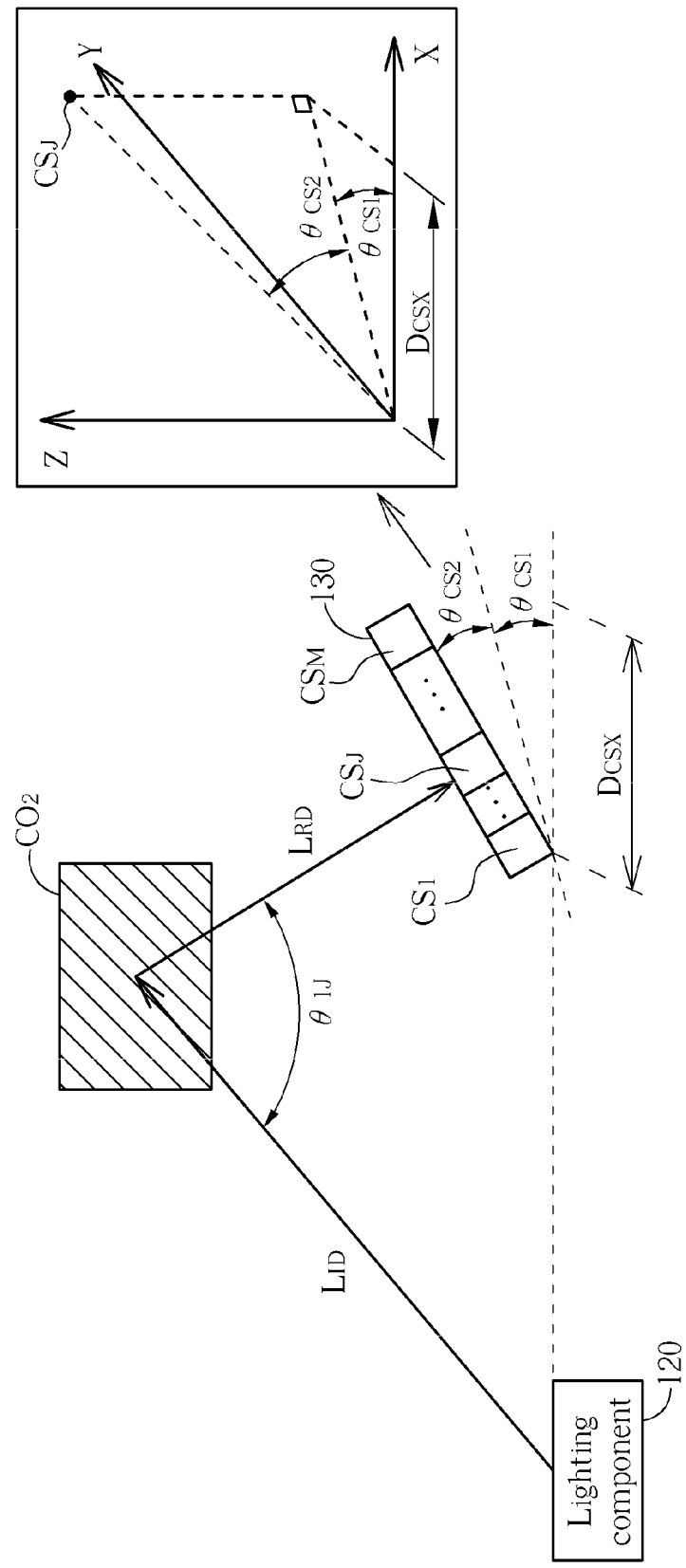

Please refer to FIG. 5 and FIG. 6. FIG. 5 and FIG. 6 are diagrams illustrating a calibrating method of calibrating sensing-error angles $\theta_{CS1}$ and $\theta_{CS2}$ rotated by the image sensor 130 because of the assembly error. FIG. 5 is a top view diagram of the distance-measuring device 100. As shown in FIG. 5, the sensing-error angle $\theta_{CS1}$ is on the XY plane. FIG. 6 is a side view diagram of the distance-measuring device 100. In addition, the sensing-error angles $\theta_{CS1}$ and $\theta_{CS2}$ are both shown in FIG. 6. The lighting/sensing controlling circuit 110 controls the lighting component 120 to emit the detecting light $L_{ID}$ to the calibrating object $CO_2$. The distance between the calibrating object $CO_2$ and the distance-measuring device 100 is the known distance $D_{C2}$. In FIG. 5 and FIG. 6, it is assumed that the lighting component 120 is assembled correctly (that is, the lighting-error angle $\theta_{LD}$ is zero). The detecting light $L_{ID}$ emits to the calibrating object $CO_2$, and the reflecting light $L_{RD}$ generated by the calibrating object $CO_2$ reflecting the detecting light $L_{ID}$ is focused to the sensing unit $CS_J$. The included angle between the detecting light $L_{ID}$ and the reflecting light $L_{RD}$ is $\theta_{1J}$. The included angle between the straight line $L_F$ and the reflecting light $L_{RD}$ is $\theta_{2J}$. It can be seen in FIG. 6 that $D_{CSX}$ is a projected distance projected by the imaging location $D_{CSJ}$ of the reflecting light $L_{RD}$, and the relation between the imaging location $D_{CSJ}$ and the projected distance $D_{CSX}$ is represented as the following formula:

$$D_{CSX}=D_{CSJ}\times\cos\theta_{CS2}\times\cos\theta_{CS1} \quad (6).$$

In FIG. 5, the straight line L is parallel to the detecting light $L_{ID}$. Consequently, the included angle $\theta_{2J}$ between the straight line $L_F$ and the reflecting light $L_{RD}$ is equal to the included angle $\theta_{1J}$ between the detecting light $L_{ID}$ and the reflecting light $L_{RD}$. That is, tan $\theta_{1J}$ is equal to tan $\theta_{2J}$. In this way, the relation between the known distance $D_{C2}$ and the projected distance $D_{CSX}$ is represented as the following formula:

$$L/D_{C2}=D_{CSX}/D_F \quad (7);$$

hence, the following formulas are obtained according to the formulas (6) and (7):

$$D_{C2}=1/(A\times D_{CSJ}) \quad (8);$$

$$A=(\cos\theta_{CS2}\times\cos\theta_{CS1})/(D_F\times L) \quad (9);$$

wherein A represents the calibrating parameter for calibrating the sensing-error angles $\theta_{CS2}$ and $\theta_{CS1}$. Thus, the parameter-calculating circuit 150 calculates the calibrating parameter A according to the formula (8). In this way, the parameter-calculating circuit 150 outputs the calibrating parameter A to the distance-calculating circuit 140 through the parameter signal $S_{AB}$, so that the distance-calculating circuit 140 calibrates the formula (2) to be the following formula for calculating the calculated measured distance $D_M$:

$$D_M=1/(A\times D_{CS1}) \quad (10);$$

it can be seen that even the image sensor 130 rotates the sensing-error angles $\theta_{CS1}$ and $\theta_{CS2}$ because of the assembly error, the distance-calculating circuit 140 still can correctly calculate the measured distance $D_M$, according to the calibrating parameter A, and the imaging location $D_{CS}$ of the reflecting light $L_{RD}$ when the measured object MO is measured, by means of the parameter-calculating circuit 150 calculating out the calibrating parameter A capable of calibrating the sensing-error angles $\theta_{CS1}$ and $\theta_{CS2}$.

It is assumed that the detecting light $L_{ID}$ emitted by the lighting component 120 rotates the lighting-error angle $\theta_{LD}$, and the image sensor 130 also rotates the sensing-error angles $\theta_{CS1}$ and $\theta_{CS2}$, because of the assembly error of the distance-measuring device 100. The distance-measuring device 100 can obtain the imaging location $D_{CS1}$ of the reflecting light $L_{RD}$ corresponding to the calibrating object $CO_1$ and the imaging location $D_{CS2}$ of the reflecting light $L_{RD}$ corresponding to the calibrating object $CO_2$ by the lighting component 120 emitting the detecting light $L_{ID}$ to the calibrating objects $CO_1$ and $CO_2$, according to the illustration of FIG. 4, FIG. 5, and FIG. 6. The relations among the imaging locations $D_{CS1}$ and $D_{CS2}$, the known distance $D_{C1}$ between the distance-measuring device 100 and the calibrating object $CO_1$, the known distance $D_{C2}$ between the distance-measuring device 100 and the calibrating object $CO_2$, and the calibrating parameters A and B are represented as the following formulas:

$$D_{C1}=1/[A\times D_{CS1}+B] \quad (11);$$

$$D_{C2}=1/[A\times D_{CS2}+B] \quad (12);$$

the parameter-calculating circuit 150 calculates the calibrating parameter A capable of calibrating the sensing-error angles $\theta_{CS1}$ and $\theta_{CS2}$, and the calibrating parameter B capable of calibrating the lighting-error angles $\theta_{LD}$, according to the formulas (11) and (12). The parameter-calculating circuit 150 outputs the calibrating parameters A and B to the distance-calculating circuit 140 through the parameter signal $S_{AB}$, so that the distance-calculating circuit 140 calibrates the formula (2) to be the following formula for calculating the calculated measured distance $D_M$:

$$D_M = 1/[A \times D_{CS1} + B] \quad (13);$$

in this way, even the detecting light $L_{ID}$ emitted by the lighting component 120 rotates the lighting-error angle $\theta_{LD}$, and the image sensor 130 rotates the sensing-error angles $\theta_{CS1}$ and $\theta_{CS2}$ at the same time, the distance-calculating circuit 140 still can correctly calculate the measured distance $D_M$ by the parameter-calculating circuit 150 calculating out the calibrating parameter A, which is capable of calibrating the sensing-error angles $\theta_{CS1}$ and $\theta_{CS2}$, and the calibrating parameter B, which is capable of calibrating the lighting-error angle $\theta_{LD}$.

In addition, according to the formula (13), when the distance-calculating circuit 140 calculates the measured distance $D_M$, only the calibrating parameters A and B, and the imaging location $D_{CS}$ of the reflecting light $L_{RD}$ when the measured object MO is measured are required. The focus length $D_F$ of the lens $LEN_1$ and predetermined distance L do not have to be known. In other words, even the focus length $D_F$ of the lens $LEN_1$ and predetermined distance L are affected because of the assembly error during the fabrication, the distance-calculating circuit 140 still can correctly calculates the measured distance $D_M$ according to the formula (13).

Figure 7:
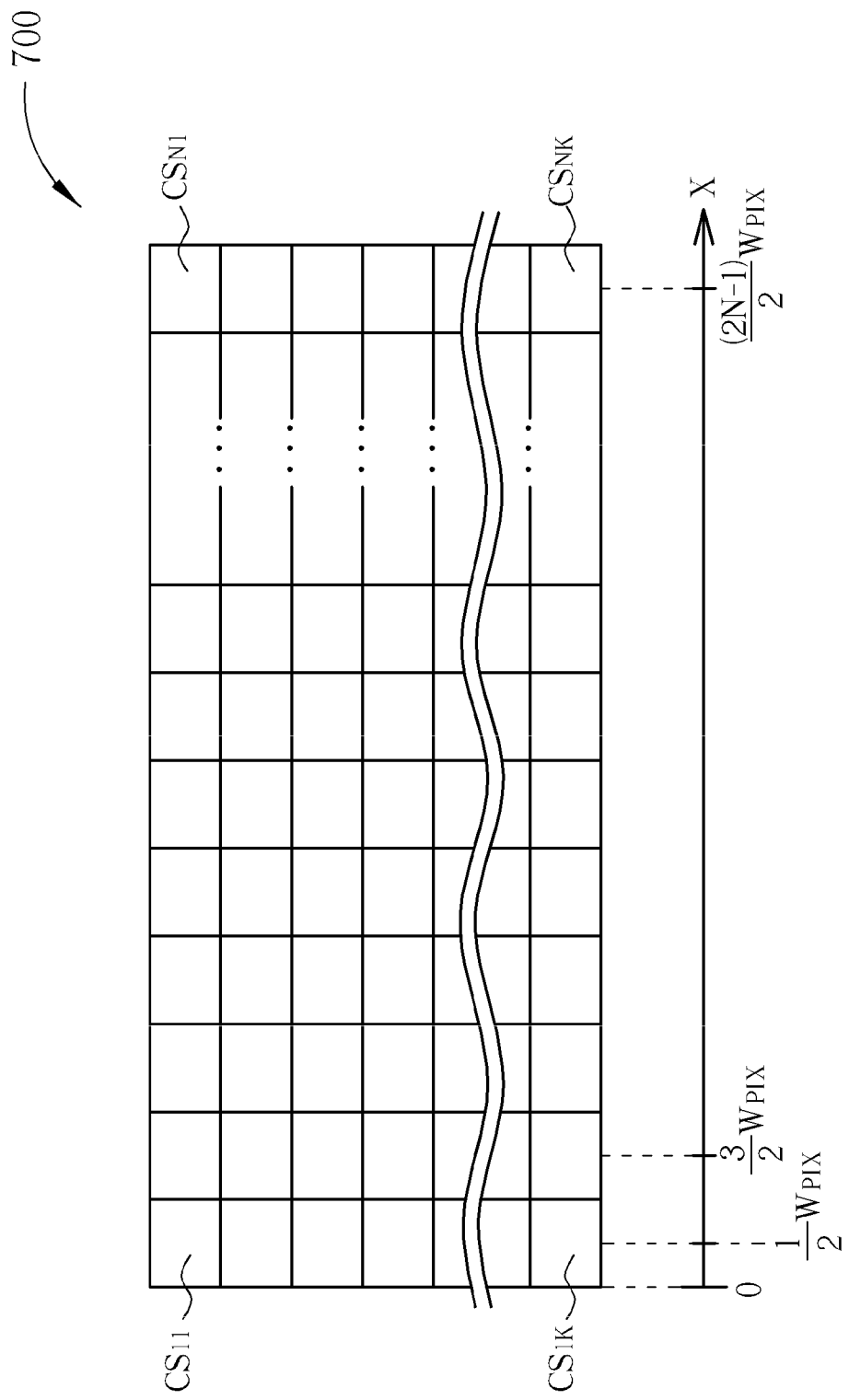
FIG. 7 is a diagram illustrating the structure of an image sensor according to a first embodiment of the present invention.

Please refer to FIG. 7. FIG. 7 is a diagram illustrating the structure of an image sensor 700 according to a first embodiment of the present invention. As shown in FIG. 7, the M sensing units of the image sensor 700 are arranged in N columns and K rows. In the image sensor 700, the horizontal locations (that is, the location in the horizontal direction or in the direction of the X-axis shown in FIG. 7) of the sensing units of the same column are the same. Moreover, it is assumed that the widths of the sensing units $CS_{11} \sim CS_{NK}$ are all equal to $W_{PIX}$ and the horizontal location of the left side of the sensing unit $CS_{11}$ is represented by zero. If the horizontal location of the sensing units of one column is represented by the center of the column, then the horizontal location of the sensing units $CS_{11} \sim CS_{1K}$ of the 1$^{st}$ column is represented as $1/2 \times W_{PIX}$; the horizontal location of the sensing units $CS_{21} \sim CS_{2K}$ of the 2$^{nd}$ column is represented as $3/2 \times W_{PIX}$; the horizontal location of the sensing units $CS_{N1} \sim CS_{NK}$ of the N$^{th}$ column is represented as $[(2 \times N-1) \times W_{PIX}]/2$, and so on. Therefore, in the image sensor 700, the horizontal locations of the sensing units of each row can be represented as $\{1/2 \times W_{PIX}, 3/2 \times W_{PIX}, \ldots [(2 \times N-1) \times W_{PIX}]/2\}$, according to the above-mentioned illustration.

Figure 8:
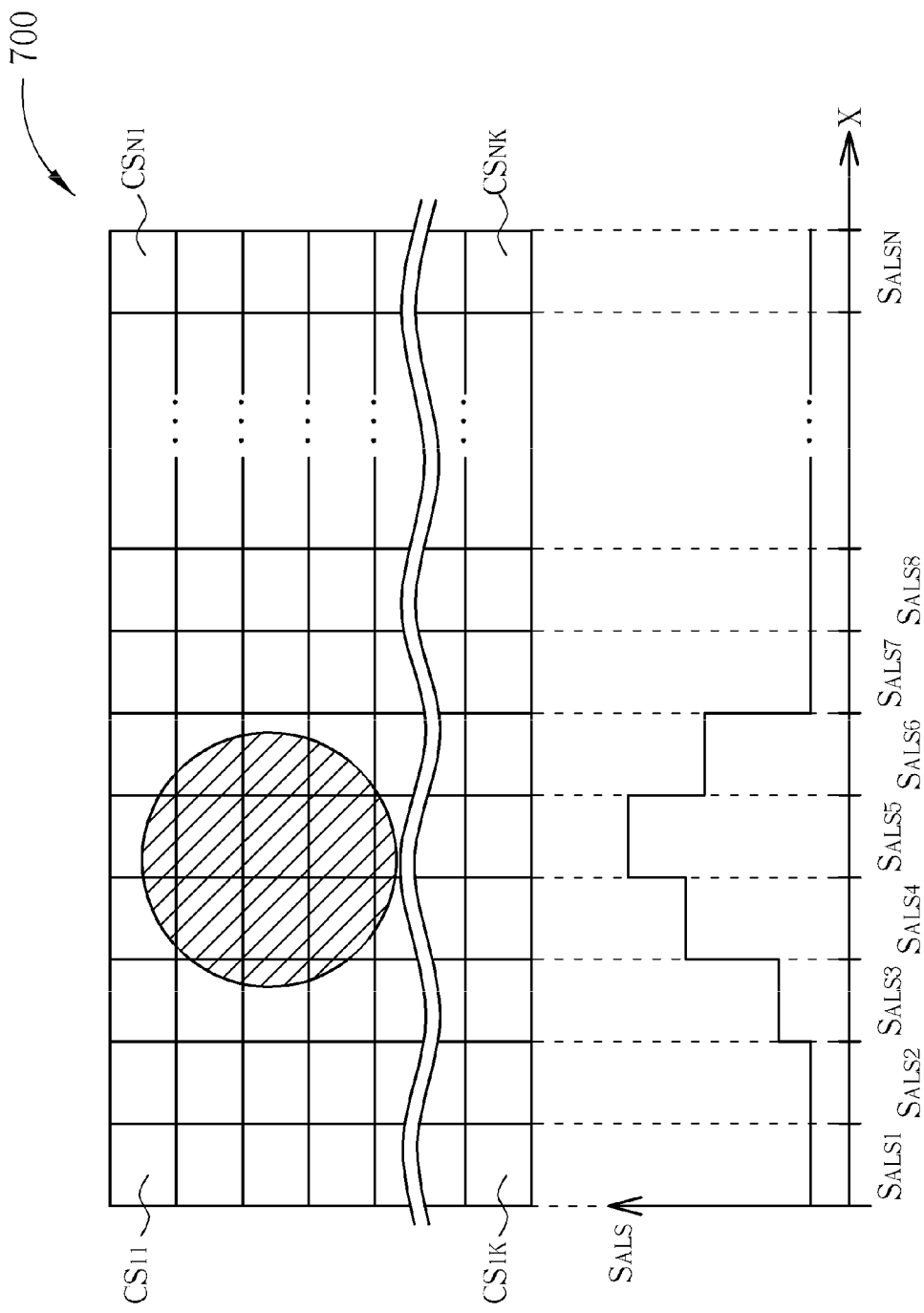
FIG. 8 is a diagram illustrating the operation principle of detecting the imaging location of the reflecting light by the image sensor of FIG. 7.

Please refer to FIG. 8. FIG. 8 is a diagram illustrating the operation principle of detecting the imaging location $D_{CS}$ of the reflecting light $L_{RD}$ by the image sensor 700. The circle shown in the upper part of FIG. 8 represents the imaging location $D_{CS}$ of the reflecting light $L_{RD}$ on the image sensor 700. That is, the sensing units inside the circle sense the energy of the reflecting light $L_{RD}$ so as to generate the light-sensed signals $S_{LS}$ having the larger values than the other sensing units. For obtaining the imaging location $D_{CS}$ of the reflecting light $D_{CS}$, the light-sensed signals $S_{LD}$ generated by sensing units of each column are respectively summed for obtaining the accumulated light-sensed signals $S_{ALS}$ for each column. For example, the accumulated light-sensed signal generated by summing the light-sensed signals of the sensing units $CS_{11} \sim CS_{1K}$ of the 1$^{st}$ column is $S_{ALS1}$; the accumulated light-sensed signal generated by summing the light-sensed signals of the sensing units $CS_{21} \sim CS_{2K}$ of the 2$^{nd}$ column is $S_{ALS2}$; the accumulated light-sensed signal generated by summing the light-sensed signals of the sensing units $CS_{N1} \sim CS_{NK}$ is of the N$^{th}$ column $S_{ALSN}$, and so on. Since the sensing units sensing the reflecting light $L_{RD}$ generate the light-sensed signals having the larger values, the sensing units near the imaging location $D_{CS}$ of the reflecting light $L_{RD}$ (that is, inside the circle) all generate the light-sensed signals having the larger values. In other words, among the accumulated light-sensed signals $S_{ALS1} \sim S_{ALSN}$, if the accumulated light-sensed signal $S_{ALSF}$, which corresponds to the sensing units $CS_{F1} \sim CS_{FK}$ of the F$^{th}$ column, has the maximum value, it represents that the imaging location $D_{CS}$ of the reflecting light $L_{RD}$ (that is, the center of the circle) is at the F$^{th}$ column. In this way, the horizontal direction of the F$^{th}$ column is utilized for representing the imaging location $D_{CS}$ of the reflecting light $L_{RD}$. For instance, as shown in FIG. 8, the accumulated light-sensed signal $S_{ALS5}$ corresponding to the sensing units $CS_{51} \sim CS_{5K}$ of 5$^{th}$ column has the maximum value. Therefore, the imaging location $D_{CS}$ of the reflecting light $L_{RD}$ (that is, the center of the circle) is determined at the 5$^{th}$ column. In this way, the horizontal location of the 5$^{th}$ column $(9/2 \times W_{PIX})$ can represent the imaging location $D_{CS}$ of the reflecting light $L_{RD}$.

Figure 9:
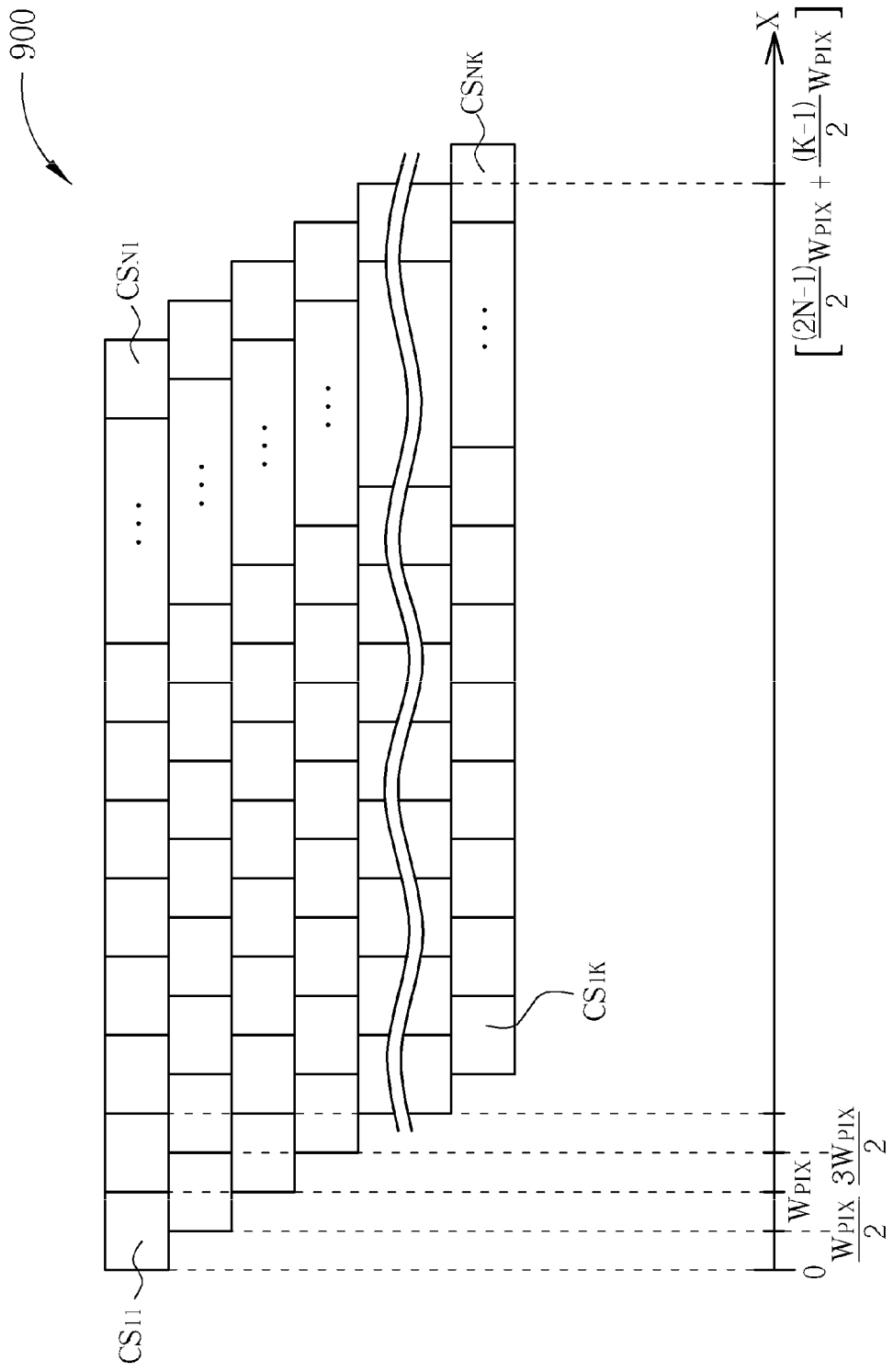
FIG. 9 is a diagram illustrating the structure of an image sensor according to another embodiment of the present invention.

Please refer to FIG. 9. FIG. 9 is a diagram illustrating the structure of an image sensor 900 according to another embodiment of the present invention. As shown in FIG. 9, the M sensing units of the image sensor 900 are arranged in N columns and K rows. Comparing with the image sensor 700, in the image sensor 900, the horizontal locations of each sensing unit of one row is shifted by a shifting distance $D_{SF}$, which is assumed to be $W_{PIX}/2$ in FIG. 9. For example, the horizontal locations of the sensing units $CS_{11} \sim CS_{N1}$ of the 1$^{st}$ row can be represented as $\{1/2 \times W_{PIX}, 3/2 \times W_{PIX}, \ldots, [(2 \times N+1) \times W_{PIX}]/2\}$; the horizontal locations of the sensing units $CS_{12} \sim CS_{N2}$ of the 2$^{nd}$ row can be represented as $\{W_{PIX}, 2 \times W_{PIX}, \ldots, [2 \times N \times W_{PIX}]/2\}$; the horizontal locations of the sensing units $CS_{1K} \sim CS_{NK}$ of the K$^{th}$ row can be represented as $\{[1/2+(K-1)/2] \times W_{PIX}, [3/2+(K-1)/2] \times W_{PIX}, \ldots, [(2 \times N-1)/2+(K-1)/2] \times W_{PIX}\}$, and so on.

Figure 10:
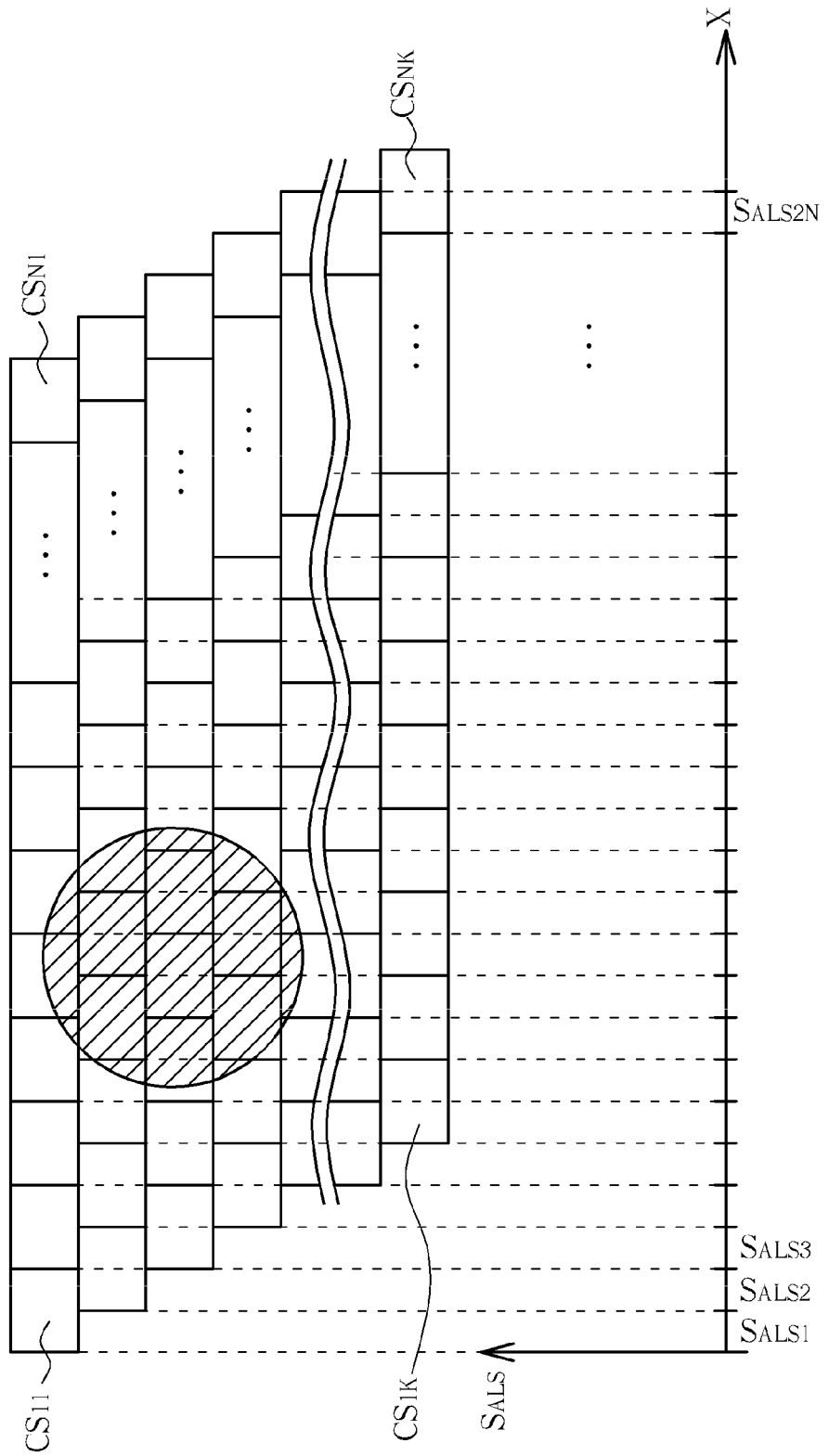
FIG. 10 is a diagram illustrating the operation principle of detecting the imaging location of the reflecting light by the image sensor of FIG. 9.

Please refer to FIG. 10. FIG. 10 is a diagram illustrating the operation principle of detecting the imaging location $D_{CS}$ of the reflecting light $L_{RD}$ by the µimage sensor 900. The circle shown in the upper part of FIG. 9 represents the imaging location of the reflecting light $L_{RD}$ on the image sensor 900. The accumulated light-sensed signals generated according to the light-sensed signals of the sensing units $CS_{11} \sim CS_{NK}$ of the image sensor 900 are $S_{ASL1} \sim S_{ALSN}$. The sensing range corresponding to the accumulated light-sensed signals $S_{ALS1}$ is the horizontal locations $0 \sim W_{PIX}/2$. Since among the sensing units $CS_{11} \sim CS_{NK}$, only the sensing range of the sensing unit $CS_{11}$ has a part in the sensing range corresponding to the accumulated light-sensed signals $S_{ALS1}$, the accumulated light-sensed signal $S_{ALS1}$ is equal to the value of the light-sensed signal generated by the sensing unit $CS_{11}$. The sensing range corresponding to the accumulated light-sensed signals $S_{ALS2}$ is $W_{PIX}/2 \sim W_{PIX}$. Since among the sensing units $CS_{11} \sim CS_{NK}$, the sensing range of the sensing unit $CS_{11}$ and the sensing range of the sensing unit $CS_{21}$ both have a part in the sensing range corresponding to the accumulated light-sensed signals $S_{ALS2}$, the accumulated light-sensed signal $S_{ALS1}$ is obtained by summing the light-sensed signals generated by the sensing unit $CS_{11}$ and $CS_{21}$. The other accumulated light-sensed signals can be obtained in similar way. Among the accumulated light-sensed signals $S_{ALS1} \sim S_{ALS2N}$, if the accumulated light-sensed signal $S_{ALSF}$ has the maximum value, it represents that the imaging location of the reflecting light $L_{RD}$ (that is, the center of the circle) is at the sensing units $CS_{F1}$~$CS_{FK}$ of the $F^{th}$ column. For instance, as shown in FIG. 10, the accumulated light-sensed signal $S_{ALS10}$ has the maximum value. Thus, the imaging location of the reflecting light $L_{RD}$ (that is, the center of the circle) is determined to be at the horizontal location of the accumulated light-sensed signal $S_{ALS10}$. Since the sensing range corresponding to the accumulated light-sensed signal $S_{ALS10}$ is $9/2 \times W_{PIX}$~$5 \times W_{PIX}$. Consequently, the horizontal location of the accumulated light-sensed signal $S_{ALS10}$ is represented as $19/4 \times W_{PIX}$. In this way, the horizontal location $19/4 \times W_{PIX}$ represents the imaging location $D_{CS}$ of the reflecting light $L_{RD}$.

Comparing with the image sensor 700, the image sensor 900 has a higher resolution. For example, when the image location $D_{CS}$ of the reflecting light $L_{RD}$ is detected by the image sensor 700, if the horizontal location of the image location $D_{CS}$ of the reflecting light $L_{RD}$ (the center of the circle) is actually $(17/4) \times W_{PIX}$, the accumulated light-sensed signal $S_{ALS5}$ has the maximum value. Therefore, the image location $D_{CS}$ of the reflecting light $L_{RD}$ is represented by the horizontal location $9/2 \times W_{PIX}$ of the $5^{th}$ column. However, if the horizontal location of the image location $D_{CS}$ of the reflecting light $L_{RD}$ (the center of the circle) changes to $(19/4) \times W_{PIX}$, the accumulated light-sensed signal $S_{ALS5}$ still has the maximum value. That is, although the actual horizontal location of the imaging location $D_{CS}$ of the reflecting light $L_{RD}$ has already changed from $(17/4) \times W_{PIX}$ to $(19/4) \times W_{PIX}$, the imaging location $D_{CS}$ of the reflecting light $L_{RD}$ is still represented as $9/2 \times W_{PIX}$ (the horizontal location of the $5^{th}$ column) by means of the image sensor 700. However, when the image location $D_{CS}$ of the reflecting light $L_{RD}$ is detected by the image sensor 900, if the horizontal location of the image location $D_{CS}$ of the reflecting light $L_{RD}$ (the center of the circle) is actually $(17/4) \times W_{PIX}$, the accumulated light-sensed signal $S_{ALS9}$ has the maximum value. Therefore, the image location $D_{CS}$ of the reflecting light $L_{RD}$ is represented by the horizontal location $17/4 \times W_{PIX}$ of the $9^{th}$ column. If the horizontal location of the image location $D_{CS}$ of the reflecting light $L_{RD}$ (the center of the circle) changes to $(19/4) \times W_{PIX}$, the accumulated light-sensed signal $S_{ALS10}$ has the maximum value. As a result, the image location $D_{CS}$ of the reflecting light $L_{RD}$ is represented by the horizontal location $19/4 \times W_{PIX}$ of the $10^{th}$ column. Consequently, the imaging location $D_{CS}$ of the reflecting light $L_{RD}$ are more accurately detected by the image sensor 900. In conclusion, by shifting the horizontal locations of each sensing unit of the same column, the image sensor 900 has the higher resolution than the image sensor 700.

However, in the image sensor 900, the shifting distances between the adjacent rows of the sensing units do not have to be the same. For example, the shifting distance between the $1^{st}$ and the $2^{nd}$ rows of the sensing units is $W_{PIX}/2$; the shifting distance between the $2^{nd}$ and the $3^{rd}$ rows of the sensing units is $W_{PIX}/4$. By such organization, the imaging location $D_{CS}$ of the reflecting light $L_{RD}$ still can be detected by the method illustrated in FIG. 10.

Figure 11:
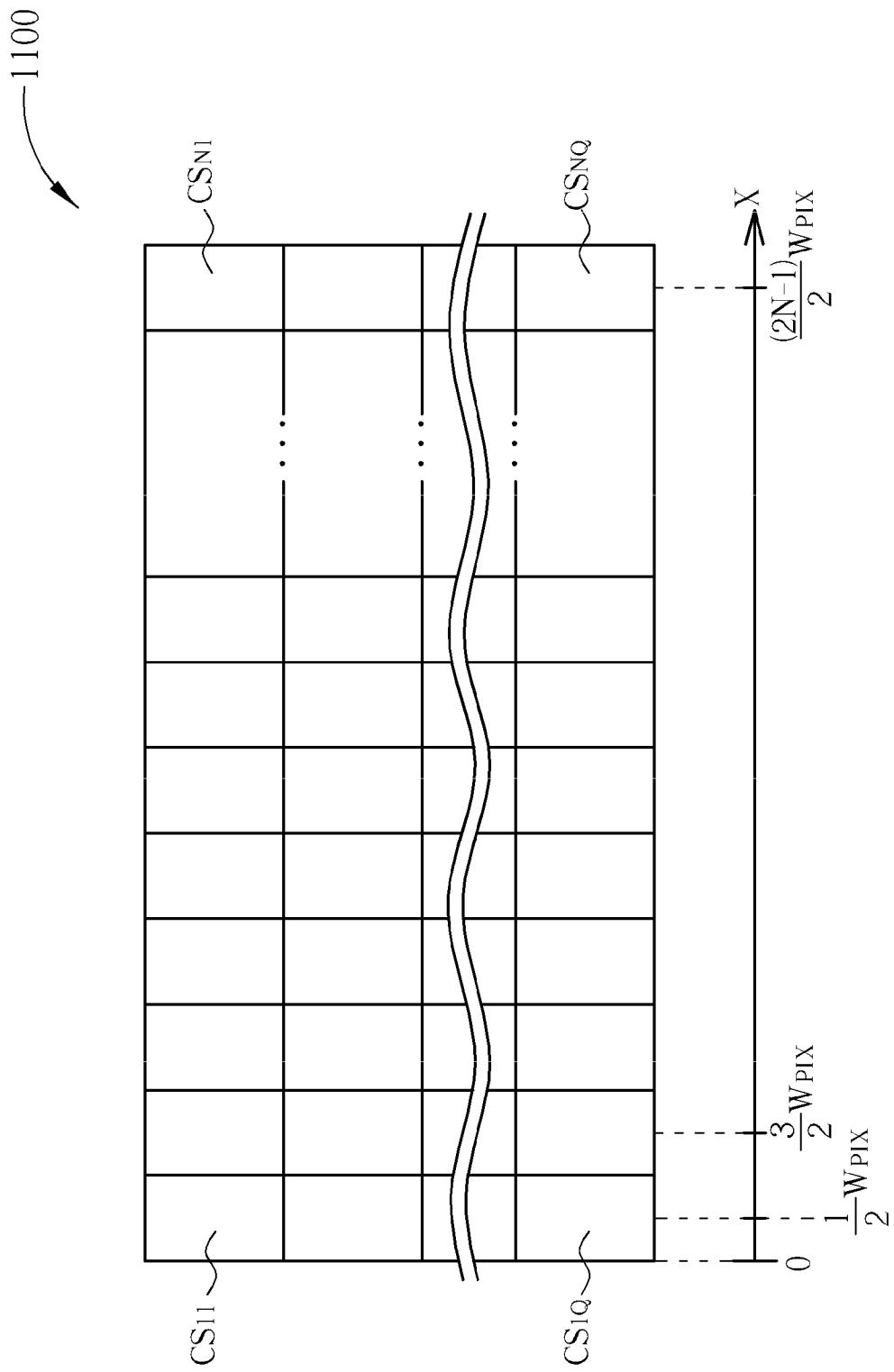
FIG. 11 is a diagram illustrating the structure of an image sensor according to another embodiment of the present invention.

Please refer to FIG. 11. FIG. 11 is a diagram illustrating the structure of an image sensor 1100 according to another embodiment of the present invention. As shown in FIG. 11, the M sensing units of the image sensor 1100 are arranged in N columns and Q rows. Comparing the image sensor 1100 with the image sensor 700, it can be understood that each sensing unit in the image sensor 700 is a square. However, each sensing unit in the image sensor 1100 is a rectangle. For instance, both the width and the height of each sensing unit of image sensor 700 are equal to $W_{PIX}$, but, the width of each sensing unit of image sensor 1100 is $W_{PIX}$ and the height of each sensing unit of image sensor 1100 is $(W_{PIX} \times K/Q)$, wherein Q<K. That is, the long side of each sensing unit of image sensor 1100 is in the vertical direction, and the short side of each sensing unit of image sensor 1100 is in the horizontal direction (the X-axis direction). In other words, each sensing unit of image sensor 1100 has the same width as the each sensing unit of image sensor 700. Although the number Q is smaller than the number K, the total area of the sensing units of one column of the image sensor 1100 is still equal to the total area of the sensing units of one column of the image sensor 700. Similar to the image sensor 700, the image sensor 1100 also provides M light-sensed signals generated by the M sensing units to the distance-calculating circuit 140, so that the distance-calculating circuit 140 calculates the accumulated light-sensed signals $S_{ALS1}$~$S_{ALSN}$. For example, the accumulated light-sensed signal generated by summing the light-sensed signals of the sensing units $CS_{11}$~$CS_{1Q}$ of the $1^{st}$ column is $S_{ALS1}$; the accumulated light-sensed signal generated by summing the light-sensed signals of the sensing units $CS_{21}$~$CS_{2Q}$ of the $2^{nd}$ column is $S_{ALS2}$; the accumulated light-sensed signal generated by summing the light-sensed signals of the sensing units $CS_{N1}$~$CS_{NQ}$ of the $N^{th}$ column is $S_{ALSN}$, and so on. In this way, the distance-calculating circuit 140 obtains the imaging location $D_{CS}$ of the reflecting light $L_{RD}$ according to the accumulated light-sensed signals $S_{ALS1}$~$S_{ALSN}$ by the method illustrated in FIG. 8, and accordingly calculates the measured distance $D_M$.

Comparing with the image sensor 700, it can be seen that in the image sensor 1100, the side of each sensing unit in the vertical direction is longer, so that the number of sensing units of one column is reduced (that is Q<K). Therefore, the number of the accumulating times which the distance-calculating circuit 140 generates the accumulated light-sensed signals $S_{ALS1}$~$S_{ALSN}$, is reduced as well. Since the total area of the sensing units of one column of the image sensor 1100 is the same as the total area of the sensing units of one column of the image sensor 700, the received energy of the sensing units of each column sensing the light focused by the lens $LEN_1$ remains unchanged. In other words, when the imaging location $D_{CS}$ of the reflecting light $L_{RD}$ is measured by means of the image sensor 1100, the computation of the distance-calculating circuit 140 generating the accumulated light-sensed signals $S_{ALS1}$~$S_{ALSN}$ is reduced, and the noise-to-signal ratios of the accumulated light-sensed signals $S_{ALS1}$~$S_{ALSN}$ are maintained at the same time. In addition, the short side of the sensing units of each column of the image sensor 1100 is in the horizontal direction and the width of each column sensing units is $W_{PIX}$. In other words, when the imaging location $D_{CS}$ of the reflecting light $L_{RD}$ is measured, the image sensor 1100 has the same resolution as the image sensor 700. Thus, comparing with the image sensor 700, it can be seen that the image sensor 1100 reduces the computation of the distance-calculating circuit 140 generating the accumulated light-sensed signals $S_{ALS1}$~$S_{ALSN}$ and maintains the resolution of the imaging location $D_{CS}$ in the horizontal direction (that is, the direction of the short side) and the signal-to-noise ratios of the accumulated light-sensed signals as well.

In conclusion, the distance-measuring device provided by the present invention reduces the effect of the background light and the flicker phenomenon by means of removing the parts corresponding to the background light and the flicking light from the light-sensed signals generated by the image sensor. In the image sensor of the present invention, the resolution is improved by shifting the sensing units of adjacent rows. In addition, the present invention further provides a calibrating method of the distance-measuring device. The first imaging location corresponding to the first calibrating object and the second imaging location corresponding to the second calibrating object are respectively obtained by means of the lighting component emits the detecting light to the first calibrating object with the first known distance and to the second calibrating object with the second known distance. The calibrating parameters capable of calibrating the assembly error of the distance-measuring device are calculated out according to the first and the second imaging location, and the first and the second known distance. In this way, the distance-measuring device correctly calculates the measured distance by means of the calibrating parameters, providing a great convenience.

In addition, when the ambient temperature of the distance-measuring device changes, the change of the distances between the internal components of the distance-measuring device and the deformation of the internal components are induced. For instance, the lens of the distance-measuring device is expanded so that the surface curvature and the refractive index of the lens change. In this way, the imaging location of the reflecting light focused by the lens onto the image sensor changes. In other words, the change of the ambient temperature induces the change of the imaging location of the reflecting light. Therefore, when the ambient temperature changes, the measured distance calculated by the distance-measuring device has an error. Consequently, the present invention provides a calibrating method of calibrating the measured distance of the measured object measured by the distance-measuring device according to the ambient temperature. The operational principle of the calibrating method is illustrated in the following description.

Figure 12:
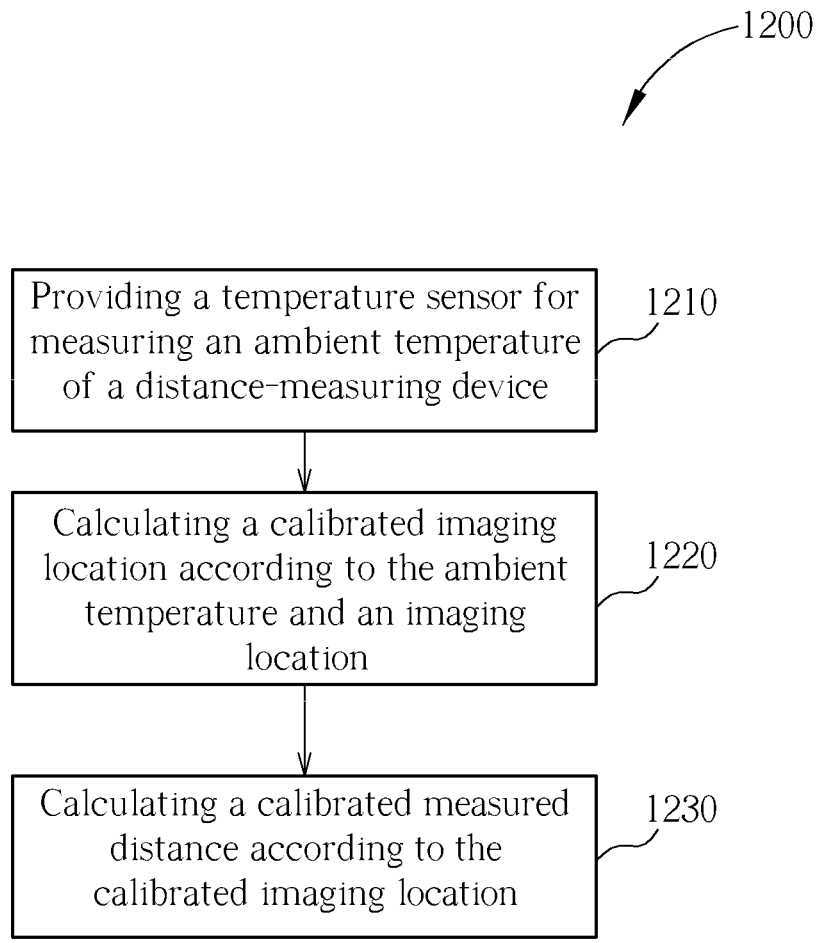
FIG. 12 is a diagram illustrating a calibrating method of calibrating a measured distance of a measured object measured by a distance-measuring device according to an ambient temperature.

Please refer to FIG. 12. FIG. 12 is a diagram illustrating a calibrating method 1200 of calibrating a measured distance $D_M$ of a measured object MO measured by a distance-measuring device DMD according to an ambient temperature $TEMP_{AMB}$. The distance-measuring device DMD includes a lighting component LD, a lens $LEN_1$, and an image sensor CS. The distance between the lighting component LD and the image sensor CS is a predetermined distance $L_1$. The lighting component LD emits a detecting light $L_{ID}$ to the measured object MO so as to generate a reflecting light $L_{RD}$. The reflecting light $L_{RD}$ is focused by the lens $LEN_1$ onto the image sensor CS so as to form an image at the imaging location $D_{CS1}$. The distance-measuring device DMD calculates the measured distance $D_M$ between the distance-measuring device DMD and the measured object MO according to the imaging location $D_{CS1}$, the focal length $D_F$ of the lens $LEN_1$, and the predetermined distance $L_1$. The steps of the calibrating method 1200 of the present invention are illustrated as below:

step 1210: providing a temperature sensor TS for measuring the ambient temperature $TEMP_{AMB}$ of the distance-measuring device DMD;

step 1220: calculating a calibrated imaging location $D_{CS\_CAB}$ according to the ambient temperature $TEMP_{AMB}$ and the imaging location $D_{CS1}$;

step 1230: calculating a calibrated measured distance $D_M$ according to the calibrated imaging location $D_{CS\_CAB}$.

Figure 13:
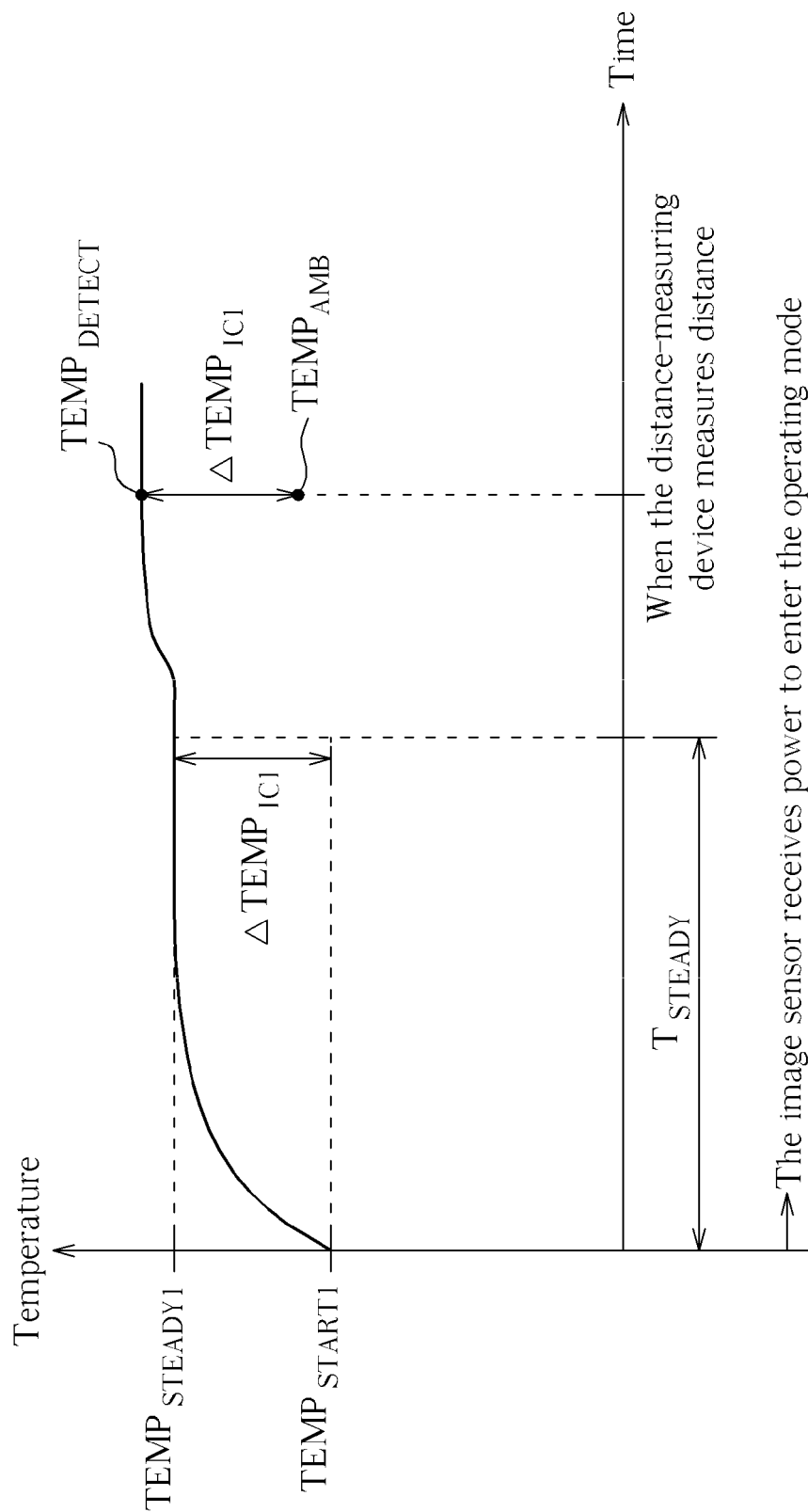
FIG. 13 is a diagram illustrating the temperature sensor measuring a start-up temperature and a steady temperature for obtaining an operating temperature variation of an image sensor when the image sensor receives power to enter the operating mode.
Figure 14:
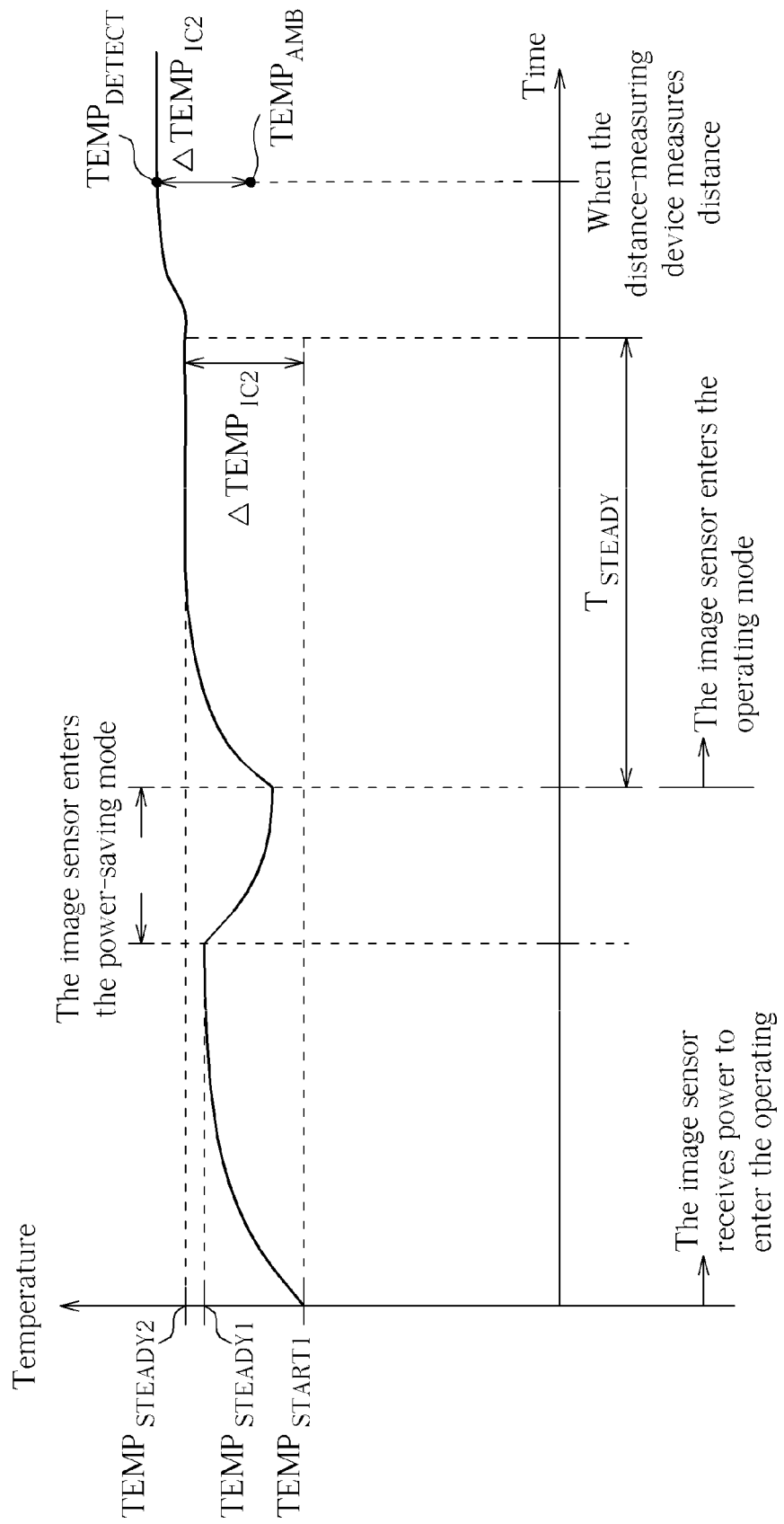
FIG. 14 is a diagram illustrating the temperature sensor re-measuring the steady temperature for obtaining the operating temperature variation of the image sensor when the image sensor enters the operating mode from a power-saving mode.

When the ambient temperature $TEMP_{AMB}$ changes, the change of the imaging location $D_{CS1}$ is mainly caused by the deformation of the lens $LEN_1$. Thus, the step 1210 of the calibrating method 1200 is mainly utilized for detecting the temperature variation of the environment of the lens $LEN_1$. For example, the temperature sensor TS is disposed near the lens $LEN_1$. In this way, when the distance-measuring device DMD measures the measured distance $D_M$, the temperature sensor TS measures the temperature of the lens $LEN_1$ so as to obtain the ambient temperature $TEMP_{AMB}$. In addition, the temperature sensor TS can also be disposed near the image sensor CS. The temperature sensor TS measures an operating temperature variation $\Delta TEMP_{IC}$ of the image sensor CS first. More particularly, as shown in FIG. 13, when the image sensor CS receives power to enter the operating mode, the temperature sensor TS measures the present temperature of the image sensor CS to obtain a start-up temperature $TEMP_{START1}$. The image sensor CS emits heat during operation so that the temperature of the image sensor CS increases as time goes by. However, as shown in FIG. 13, a delay period $T_{STEADY}$ after the image sensor CS enters the operating mode, the temperature of the image sensor CS stops increasing and approximately maintains a constant value. Meanwhile, the temperature sensor TS measures the present temperature of the image sensor CS to obtain a steady temperature $TEMP_{STEADY1}$. As a result, the operating temperature variation $\Delta TEMP_{IC1}$ due to the image sensor CS emitting heat during the operation can be calculated according to the start-up temperature $TEMP_{START1}$ and the steady temperature $TEMP_{STEADY1}$. More precisely, the operating temperature variation $\Delta TEMP_{IC1}$ due to the image sensor CS emitting heat during the operation can be calculated by subtracting the start-up temperature $TEMP_{START1}$ from the steady temperature $TEMP_{STEADY1}$. When distance-measuring device DMD measures the measured distance $D_M$, the temperature sensor TS measures the temperature of the image sensor CS to obtain a chip operation temperature $TEMP_{DETECT}$. Since the temperature of the image sensor CS is equal to the sum of the ambient temperature $TEMP_{AMB}$ and the operating temperature variation $\Delta TEMP_{IC1}$, the ambient temperature $TEMP_{AMB}$ can be obtained by subtracting the operating temperature variation $\Delta TEMP_{IC1}$ from the chip operation temperature $TEMP_{DETECT}$. In addition, as shown in FIG. 14, if the image sensor CS enters a power-saving mode, a delay period $T_{STEADY}$ after the image sensor CS enters the operating mode from the power-saving mode, the temperature of the image sensor CS is measured to obtain a new steady temperature $TEMP_{STEADY2}$. Hence, the present operating temperature variation $\Delta TEMP_{IC2}$ due to the image sensor CS emitting heat during operation can be calculated according to the steady temperature $TEMP_{STEADY2}$ and the start-up temperature $TEMP_{START1}$. In this way, even if the image sensor CS has entered the power-saving mode, the temperature sensor TS can still correctly measure operating temperature variation $\Delta TEMP_{IC2}$. Therefore, when the distance-measuring device DMD measures the measured distance $D_M$, the temperature sensor TS can correctly measure the ambient temperature $TEMP_{AMB}$ according to the chip operation temperature $TEMP_{DETECT}$ and the operating temperature variation $\Delta TEMP_{IC2}$. To sum up, in the step 1210, in addition to disposing the temperature sensor TS near the lens $LEN_1$ to directly measure the temperature of the lens $LEN_1$, the temperature sensor TS can also be disposed near the image sensor CS to measure the ambient temperature $TEMP_{AMB}$ by measuring the operating temperature variation $\Delta TEMP_{IC}$ of the image sensor CS. In addition, when the temperature sensor TS is disposed near the image sensor CS, the temperature sensor TS can be further integrated with the image sensor CS into a chip, saving the cost of the distance-measuring device DMD.

Figure 15:
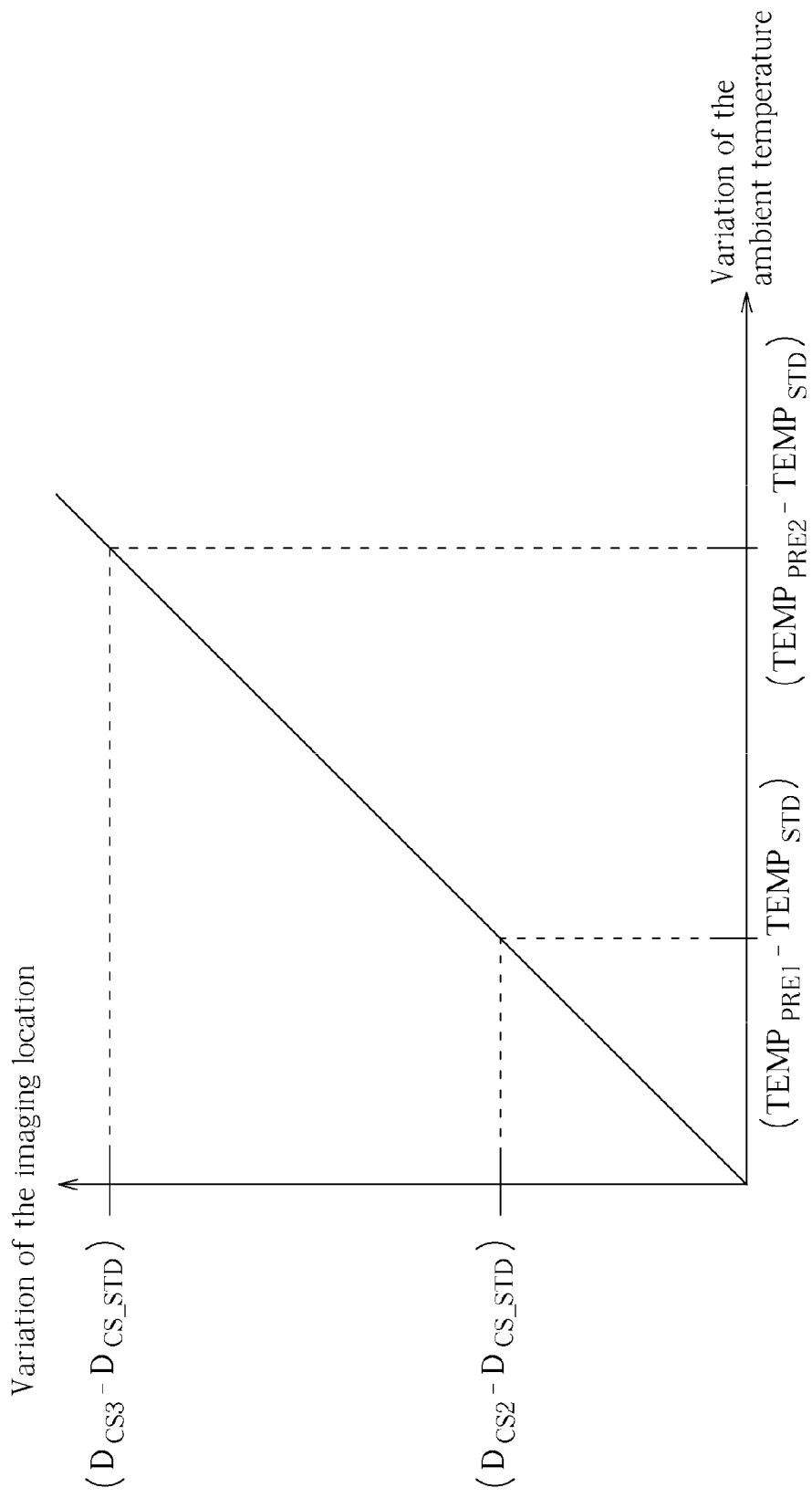
FIG. 15 is a diagram illustrating the variation of imaging location is proportional to the variation of the ambient temperature.

In the step 1220, during a calibrating phase $PH_{CAB}$, the distance-measuring device DMD measures a calibrating object $CO_3$ with a predetermined distance $D_{C3}$ respectively at predetermined ambient temperatures $TEMP_{PRE1}$ and TEMP$_{PRE2}$ (for example, 30° C. and 50° C.), so as to obtain imaging locations D$_{CS3}$ and D$_{CS4}$. That is, since the internal components such as the lens LEN$_1$ of the distance-measuring device DMD are affected by the change of the ambient temperature TEMP$_{AMB}$, the distance-measuring device DMD obtains different imaging locations (D$_{CS3}$ and D$_{CS4}$) when measuring the calibrating object CO$_3$ at different predetermined ambient temperatures (TEMP$_{PRE1}$ and TEMP$_{PRE2}$). In the step 1220, a calibrating slope SL$_{CAB}$ and a standard temperature TEMP$_{STD}$ are calculated according to the predetermined temperatures TEMP$_{PRE1}$ and TEMP$_{PRE2}$, and the imaging locations D$_{CS3}$ and D$_{CS4}$. More particularly, a standard imaging location D$_{CS\_STD}$ of the calibrating object CO$_3$ with the predetermined distance D$_{C3}$ measured by the distance-measuring device DMD at the standard temperature TEMP$_{STD}$ can be calculated according to the predetermined distance D$_{C3}$. For instance, it is assumed that the operational principle of the distance-measuring device DMD is similar to that of the distance-measuring device 100. Thus, the distance-measuring device DMD can calculate a measured distance D$_M$ according to the formula (3). In this way, by substituting the predetermined distance D$_{C3}$ into the formula (3), the following formula can be obtained:

$$D_{C3}=(D_F \times L_1)/D_{CS\_STD} \qquad (14);$$

wherein D$_F$ represents the focal length of the lens LEN$_1$ at the standard temperature TEMP$_{STD}$ (such as 25° C.) and L$_1$ represents the predetermined distance between the lighting component LD and the image sensor CS at the standard temperature TEMP$_{STD}$. As a result, the standard imaging location D$_{CS\_STD}$ calculated according to the formula (14) is the imaging location of the calibrating object CO$_3$ measured by the distance-measuring device DMD at the standard temperature TEMP$_{STD}$. Since the variation of the imaging location is approximately proportional to the variation of the ambient temperature (as shown in FIG. 15), the relationship among the imaging locations D$_{CS1}$, D$_{CS3}$, and D$_{CS\_STD}$, and the ambient temperatures TEMP$_{PRE1}$, TEMP$_{PRE2}$, and TEMP$_{STD}$ can be represented by the following equations:

$$D_{CS2}-D_{CS\_STD}=SL_{CAB} \times (TEMP_{PRE1}-TEMP_{STD}) \qquad (15); \text{ and}$$

$$D_{CS3}-D_{CS\_STD}=SL_{CAB} \times (TEMP_{PRE2}-TEMP_{STD}) \qquad (16);$$

wherein SL$_{CAB}$ is a calibrating slope representing the ratio between the variation of the imaging location and the variation of the ambient temperature. The imaging locations D$_{CS2}$, D$_{CS3}$, and D$_{CS\_STD}$, and the ambient temperatures TEMP$_{PRE1}$, TEMP$_{PRE2}$, and TEMP$_{STD}$ are all known values. Therefore, the standard temperature TEMP$_{STD}$ and the calibrating slope SL$_{CAB}$ can be calculated according to the formulas (15) and (16). In this way, a location compensation DC$_{DELTA}$ for compensating the imaging location D$_{CS1}$ of the measured object MO measured by the distance-measuring device DMD can be calculated according to the calibrating slope SL$_{CAB}$, the standard temperature TEMP$_{STD}$, and the ambient temperature TEMP$_{AMB}$ of the distance-measuring device DMD measured by the temperature sensor TS, by the following formula:

$$DC_{DELTA}=SL_{CAB} \times (TEMP_{AMB}-TEMP_{STD}) \qquad (17);$$

the calibrated imaging location D$_{CS\_CAB}$ can be calculated according to the imaging location D$_{CS1}$ and the location compensation DC$_{DELTA}$ calculated by the formula (17). More particularly, the calibrated imaging location D$_{CS\_CAB}$ can be calculated by adding the imaging location D$_{CS1}$ and the location compensation DC$_{DELTA}$ together.

In the step 1230, the calibrated measured distance D$_M$ is calculated according to the calibrated imaging location D$_{CS\_CAB}$. For instance, it is assumed that the operational principle of the distance-measuring device DMD is similar to that of the distance-measuring device 100. Hence, the measured distance D$_M$ can be calculated by substituting the calibrated imaging location D$_{CS}$ into the formula (3), as shown in the following formula:

$$D_M=(D_F \times L_1/D_{CS\_CAB} \qquad (18);$$

in addition, it is assumed that the distance-measuring device DMD further includes the parameter-calculating circuit 150. Since the parameter-calculating circuit 150 can calculate the calibrating parameter A for calibrating the sensing-error angles θ$_{CS1}$ and θ$_{CS2}$ and the calibrating parameter B for calibrating the lighting-error angle θ$_{LD}$ according to the formulas (11) and (12), the distance-measuring device DMD can calculate the calibrated measured distance D$_M$ according to the calibrating parameters A and B, by the formula (13). More precisely, when the distance-measuring device DMD uses the calibrating parameters A and B for calibrating the assembly error, and uses the calibrated imaging location D$_{CS\_CAB}$ for calibrating the effect of the temperature variation as well, the distance-measuring device DMD calculates the calibrated measured distance D$_M$ by the following formula:

$$D_M=1/[A \times D_{CS\_CAB}+B] \qquad (19);$$

wherein the relationship among the calibrating parameter A and the sensing-error angles θ$_{CS1}$ and θ$_{CS2}$ is shown in formula (9); and the relationship between the calibrating parameter B and the lighting-error angle θ$_{LD}$ is shown in formula (5).

Figure 16:
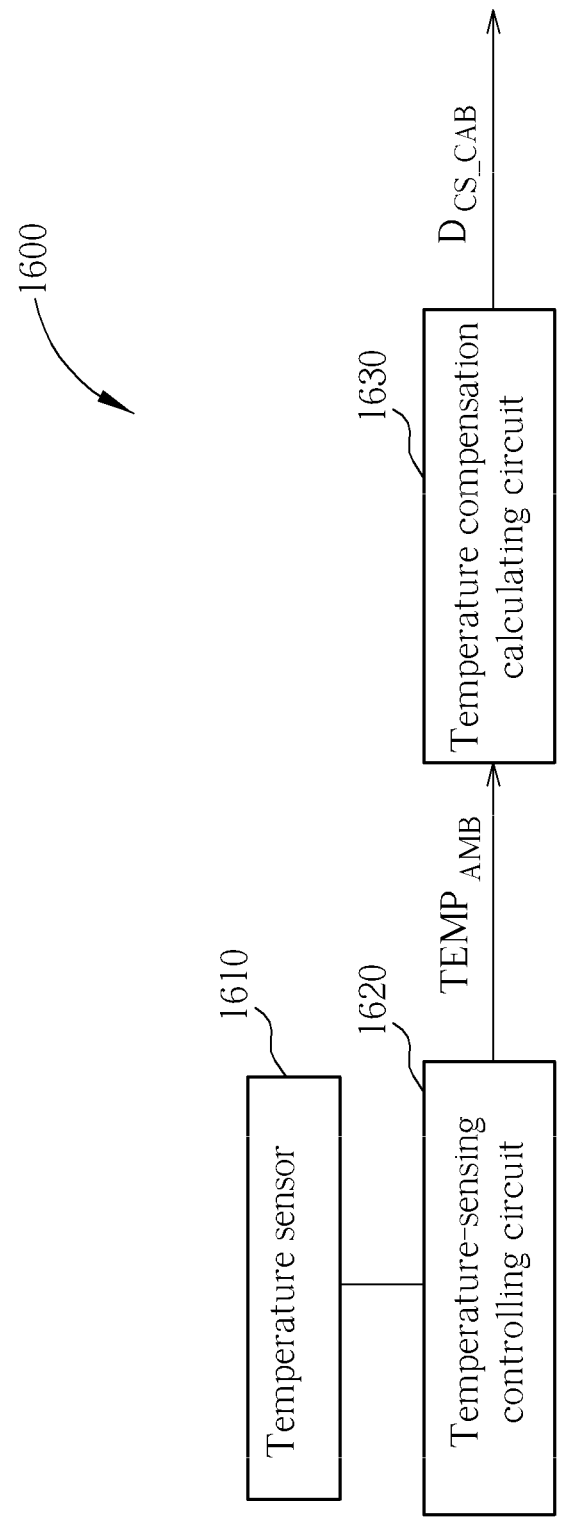
FIG. 16 is a diagram illustrating a calibrating device of calibrating the measured distance of the measured object measured by the distance-measuring device according to the ambient temperature.

According to the basic spirit of the calibrating method 1200, the present invention further provides a calibrating device. Please refer to FIG. 16. FIG. 16 is a diagram illustrating a calibrating device 1600 capable of calibrating the measured distance D$_M$ of the measured object MO measured by the distance-measuring device D$_M$ according to the ambient temperature TEMP$_{AMB}$. The calibrating device 1600 includes a temperature sensor 1610, a temperature-sensing controlling circuit 1620, and a temperature compensation calculating circuit 1630.

The temperature sensor 1610 is utilized for measuring the ambient temperature TEMP$_{AMB}$ of the distance-measuring device DMD. The structure and the operational principle of the temperature sensor 1610 are similar to those of the above-mentioned temperature sensor TS. The temperature sensor 1610 can be disposed near the lens LEN$_1$ of the distance-measuring device DMD. In this way, when the distance-measuring device DMD measures the measured distance D$_M$, the temperature sensor 1610 measures the temperature of the lens LEN$_1$ to obtain the ambient temperature TEMP$_{AMB}$. In addition, the temperature sensor 1610 can also be disposed near the image sensor CS of the distance-measuring device DMD, or further integrated with the image sensor CS into a chip for saving cost. The temperature-sensing controlling circuit 1620 controls the temperature sensor 1610 to measure the operating temperature variation ΔTEMP$_{IC}$ of the image sensor CS, and controls the temperature sensor 1610 to measure the temperature of the image sensor CS when the distance-measuring device DMD measures the measured distance D$_M$ for obtaining the chip operation temperature TEMP$_{DETECT}$. In this way, the temperature-sensing controlling circuit 1620 calculates the ambient temperature TEMP$_{AMB}$ according to the chip operation temperature TEMP$_{DETECT}$ and the operating temperature variation ΔTEMP$_{IC}$. More particularly, the temperature-sensing controlling circuit 1620 controls the temperature sensor 1610 to measure the start-up temperature $TEMP_{START}$ and the steady temperature $TEMP_{STEADY}$ of the image sensor CS by means of the method illustrated in FIG. 13 and FIG. 14, for obtaining the operating temperature variation $\Delta TEMP_{IC}$ of the image sensor CS. When the image sensor CS receives power to enter the operating mode, the temperature-sensing controlling circuit 1620 controls the temperature sensor 1610 to measure the temperature of the image sensor CS so as to obtain a start-up temperature $TEMP_{START1}$. A delay period $T_{STEADY}$ after the image sensor CS enters the operating mode, the temperature-sensing controlling circuit 1620 controls the temperature sensor 1610 to measure the temperature of the image sensor CS so as to obtain a steady temperature $T_{STEADY1}$. In this way, the temperature-sensing controlling circuit 1620 calculates the operating temperature variation $\Delta TEMP_{IC1}$ according to the steady temperature $T_{STEADY1}$ and the start-up temperature $T_{START1}$. In addition, a delay period $T_{STEADY}$ after the image sensor CS enters the operating mode from a power-saving mode, the temperature-sensing controlling circuit 1620 controls the temperature sensor 1610 to measure the temperature of the image sensor CS to obtain a new steady temperature $T_{STEADY2}$. In this way, the temperature-sensing controlling circuit 1620 can calculate a new operating temperature variation $\Delta TEMP_{IC2}$ according to the steady temperature $T_{STEADY2}$ and the start-up temperature $T_{START1}$. When the distance-measuring device DMD measures the measured distance $D_M$, the temperature-sensing controlling circuit 1620 controls the temperature sensor 1610 to measure the temperature of the image sensor CS for obtaining the chip operation temperature $TEMP_{DETECT}$. In this way, the temperature-sensing controlling circuit 1620 can calculate the ambient temperature $TEMP_{AMB}$ according to the chip operation temperature $TEMP_{DETECT}$ and the operating temperature variation $\Delta TEMP_{IC}$ by the following formula:

$$TEMP_{AMB} = TEMP_{DETECT} - \Delta TEMP_{IC} \qquad (20).$$

The temperature compensation calculating circuit 1630 calculates a calibrated imaging location $D_{CS\_CAB}$ according to the ambient temperature $TEMP_{AMB}$ and the imaging location $D_{CS1}$ of the measured object MO measured by the distance-measuring device DMD. The temperature compensation calculating circuit 1630 provides the calibrated imaging location $D_{CS\_CAB}$ to the distance-measuring device DMD so that the distance-measuring device DMD can calculate a calibrated measured distance $D_M$. More particularly, in a calibrating phase $PH_{CAB}$, the temperature compensation calculating circuit 1630 controls the distance-measuring device DMD to measure a calibrating object $CO_3$ with a predetermined distance $D_{C3}$ respectively at predetermined ambient temperatures $TEMP_{PRE1}$ and $TEMP_{PRE2}$ (for example, 30° C. and 50° C.), so as to obtain imaging locations $D_{CS3}$ and $D_{CS4}$. The temperature compensation calculating circuit 1630 calculates a calibrating slope $SL_{CAB}$ and a standard temperature $TEMP_{STD}$ according to the predetermined temperatures $TEMP_{PRE1}$ and $TEMP_{PRE2}$, and the imaging locations $D_{CS3}$ and $D_{CS4}$. More particularly, the temperature compensation calculating circuit 1630 calculates a standard imaging location $D_{CS\_STD}$ of the calibrating object $CO_3$ with the predetermined distance $D_{C3}$ measured by the distance-measuring device DMD at the standard temperature $TEMP_{STD}$ according to the predetermined distance $D_{C3}$. For instance, it is assumed that the operational principle of the distance-measuring device DMD is similar to that of the distance-measuring device 100. Thus, the distance-measuring device DMD can calculate a measured distance $D_M$ according to the formula (3). Hence, the temperature compensation calculating circuit 1630 can calculate the standard imaging location $D_{CS\_STD}$ of the calibrating object $CO_3$ with the predetermined distance $D_{C3}$ measured by the distance-measuring device DMD at the standard temperature $TEMP_{STD}$ according to the formula (14). The temperature compensation calculating circuit 1630 further calculates the calibrating slope $SL_{CAB}$ and the standard temperature $TEMP_{STD}$ according to the formulas (15) and (16). In this way, by the formula (17), the temperature compensation calculating circuit 1630 calculates the location compensation $DC_{DELTA}$ capable of compensating the imaging location $D_{CS1}$ of the measured object MO measured by the distance-measuring device DMD according to the calibrating slope $SL_{CAB}$, the standard temperature $TEMP_{STD}$, and the ambient temperature $TEMP_{AMB}$ of the distance-measuring device DMD (that is, the ambient temperature $TEMP_{AMB}$ provided by the temperature-sensing controlling circuit 1620). As a result, the temperature compensation calculating circuit 1630 adds the imaging location $D_{CS1}$ and the location compensation $DC_{DELTA}$ together to calculate the calibrated imaging location $D_{CS\_CAB}$.

The distance-measuring device DMD calculates the calibrated measured distance $D_M$ according to the calibrated imaging location $D_{CS\_CAB}$. For instance, it is assumed that the operational principle of the distance-measuring device DMD is similar to that of the distance-measuring device 100. Therefore, the distance-measuring device DMD can calculate the calibrated measured distance $D_M$ according to the calibrated imaging location $D_{CS\_CAB}$ by the formula (18). In addition, provided that the distance-measuring device DMD further includes the parameter-calculating circuit 150, since the parameter-calculating circuit 150 can calculate the calibrating parameter A for calibrating the sensing-error angles $\theta_{CS1}$ and $\theta_{CS2}$ and the calibrating parameter B for calibrating the lighting-error angle $\theta_{LD}$ according to the formulas (11) and (12), the distance-measuring device DMD can calculate the calibrated measured distance $D_M$ by the formula (13), and the calibrating parameters A and B. In this way, the distance-measuring device DMD uses the calibrating parameters A and B for calibrating the assembly error, and uses the calibrated imaging location $D_{CS\_CAB}$ for calibrating the effect of the temperature variation as well. The distance-measuring device DMD calculates the calibrated measured distance $D_M$ by the formula (19).

In conclusion, the present invention provides a calibrating method of calibrating the measured distance of the measured object measured by the distance-measuring device according to the ambient temperature. The calibrating method provided by the present invention includes providing a temperature sensor for measuring the ambient temperature of the distance-measuring device, calculating a first calibrated imaging location according to the ambient temperature and the imaging location, and calculating a calibrated measured distance according to the first calibrated imaging location. In this way, when the distance-measuring device measures distance, the error due to the variation of the ambient temperature is avoided according to the calibrating method. In addition, in the calibrating method of the present invention, the temperature sensor can be disposed near the lens of the distance-measuring device to directly measure the ambient temperature. However, the temperature sensor can also be disposed near the image sensor to indirectly measure the ambient temperature. In this way, the temperature sensor can be integrated with the image sensor into a chip to reduce the cost of distance-measuring device, providing a great convenience to the user.

Those skilled in the art will readily observe that numerous modifications and alterations of the device and method may be made while retaining the teachings of the invention.

What is claimed is:

1. A distance-measuring device, comprising:
   a lighting component, emitting a detecting light to a measured object to generate a reflective light;
   a first lens, disposed in a transmission path of the reflective light;
   an image sensor, the reflective light being focused by the first lens onto the image sensor for the measured object to form an image at a first imaging location,
   a distance-calculating circuit calculating a measured distance between the distance-measuring device and the measured object according to the first imaging location, a focal length of the first lens, and a first predetermined distance between the lighting component and the image sensor;
   a temperature sensor for measuring the ambient temperature of the distance-measuring device;
   a temperature compensation calculating circuit for calculating a first calibrated imaging location according to the ambient temperature and the first imaging location, and providing the first calibrated imaging location to the distance-calculating circuit for calibrating the measured distance; and
   a parameter-calculating circuit utilized for providing a first calibrating parameter and a second calibrating parameter to the distance-measuring circuit; the first calibrating parameter is utilized for calibrating a first sensing-error angle and a second sensing-error angle of the image sensor; the second calibrating parameter is utilized for calibrating a lighting-error angle rotated by the detecting light emitted by the lighting component;
   wherein the distance-calculating circuit calculates the calibrated measured distance according to the following formula:

$$D_M = 1/[A \times D_{CS\_CAB} + B];$$

wherein $D_M$ represents the calibrated measured distance; A and B respectively represent the first calibrating parameter and the second calibrating parameter; and $D_{CS\_CAB}$ represents the first calibrated imaging location;
   wherein a relationship among the first calibrating parameter, the first sensing-error angle, and the second sensing-error angle is represented by the following formula:

$$A = (\cos\theta_{CS2} \times \cos\theta_{CS1})/(D_F \times L);$$

wherein $\theta_{CS1}$ represents the first sensing-error angle $\theta_{CS2}$ represents the second sensing-error angle; and L represents the first predetermined distance between the lighting component and the image sensor;
   wherein a relationship between the second calibrating parameter and the lighting-error angle is represented by the following formula:

$$B = \tan\theta_{LD}/L;$$

wherein $\theta_{LD}$ represents the lighting-error angle.

2. The distance-measuring device of claim 1, wherein the temperature sensor measures a temperature of the first lens to obtain the ambient temperature when the distance-measuring device measures the measured distance.

3. The distance-measuring device of claim 1, wherein the temperature sensor measures a temperature of the image sensor to obtain the ambient temperature when the distance-measuring device measures the measured distance.

4. The distance-measuring device of claim 3, wherein the temperature sensor and the image sensor are integrated into a chip.

5. The distance-measuring device of claim 3, further comprising:
   a temperature-sensing controlling circuit for controlling the temperature sensor to measure an operating temperature variation of the image sensor, and controlling the temperature sensor to measure a chip operation temperature of the image sensor when the distance-measuring device measures the measured distance, the temperature-sensing controlling circuit calculating the ambient temperature according to the chip operation temperature and the operating temperature variation.

6. The distance-measuring device of claim 5, wherein the temperature-sensing controlling circuit controls the temperature sensor to measure a temperature of the image sensor when the image sensor enters an operating mode, for obtaining a start-up temperature; a delay period after the image sensor enters the operating mode, the temperature-sensing controlling circuit controls the temperature sensor to measure the temperature of the image sensor for obtaining a steady temperature; and the temperature-sensing controlling circuit calculates the operating temperature variation according to the steady temperature and the start-up temperature.

7. The distance-measuring device of claim 6, wherein a delay period after the image sensor receives power to enter the operating mode, the temperature-sensing controlling circuit controls the temperature sensor to measure the temperature of the image sensor for obtaining the steady temperature; and a delay period after the image sensor enters the operating mode from a power-saving mode, the temperature-sensing controlling circuit controls the temperature sensor to measure the temperature of the image sensor for obtaining the steady temperature.

8. The distance-measuring device of claim 1, wherein in a calibrating phase, the distance-measuring device measures a calibrating object with a second predetermined distance respectively at a first predetermined ambient temperature and a second predetermined ambient temperature, for obtaining a second imaging location and a third imaging location; and the temperature compensation calculating circuit calculates a calibrating slope and a standard temperature according to the first predetermined ambient temperature, the second predetermined ambient temperature, the second imaging location, the third imaging location, and the second predetermined distance.

9. The distance-measuring device of claim 8, wherein the temperature compensation calculating circuit calculates a standard imaging location formed by the calibrating object when the distance-measuring device measures the calibrating object with the second predetermined distance at the standard temperature, according to the second predetermined distance.

10. The distance-measuring device of claim 8, wherein the temperature compensation calculating circuit calculates the calibrating slope and the standard temperature according to the following equations:

$$D_{CS2} - D_{CS\_STD} = SL_{CAB} \times (TEMP_{PRE1} - TEMP_{STD});\text{ and}$$

$$D_{CS3} - D_{CS\_STD} = SL_{CAB} \times (TEMP_{PRE2} - TEMP_{STD});$$

wherein $D_{CS2}$, $D_{CS3}$, and $D_{CS\_STD}$ respectively represent the second imaging location, the third imaging location, the standard imaging location; $SL_{CAB}$ represents the calibrating slope; and $TEMP_{PRE1}$, $TEMP_{PRE2}$, and $TEMP_{STD}$ respectively represent the first predetermined ambient temperature, the second predetermined temperature, and the standard temperature.

11. The distance-measuring device of claim 10, wherein when the distance-measuring device measures the measured distance between the measured object and the distance-measuring device, the temperature compensation calculating circuit calculates a location compensation according to the calibrating slope, the standard temperature, and the ambient temperature; and the temperature compensation calculating circuit calculates the first calibrated imaging location according to the first imaging location and the location compensation.

12. The distance-measuring device of claim 11, wherein the temperature compensation calculating circuit calculates the location compensation according to the following formula:

$$DC_{DELTA} = SL_{CAB} \times (TEMP_{AMB} - TEMP_{STD});$$

wherein $DC_{DELTA}$ represents the location compensation, and $TEMP_{AMB}$ represents the ambient temperature.

13. The distance-measuring device of claim 12, wherein the temperature compensation calculating circuit adds the first imaging location and the location compensation together to obtain the first calibrated imaging location.

* * * * *